(12) United States Patent
Seo et al.

(10) Patent No.: US 11,071,101 B2
(45) Date of Patent: Jul. 20, 2021

(54) METHOD FOR DETERMINING TRANSMISSION CONFIGURATION INDICATOR FOR TERMINAL IN WIRELESS COMMUNICATION SYSTEM AND DEVICE USING SAME METHOD

(71) Applicant: LG Electronics Inc., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/631,142

(22) PCT Filed: May 17, 2019

(86) PCT No.: PCT/KR2019/005937
§ 371 (c)(1),
(2) Date: Jan. 14, 2020

(87) PCT Pub. No.: WO2019/221553
PCT Pub. Date: Nov. 21, 2019

(65) Prior Publication Data
US 2021/0058906 A1 Feb. 25, 2021

Related U.S. Application Data

(60) Provisional application No. 62/673,114, filed on May 17, 2018, provisional application No. 62/675,140, filed on May 22, 2018, provisional application No. 62/680,528, filed on Jun. 4, 2018.

(51) Int. Cl.
*H04W 72/04* (2009.01)
*H04W 76/27* (2018.01)

(52) U.S. Cl.
CPC ......... *H04W 72/042* (2013.01); *H04W 76/27* (2018.02)

(58) Field of Classification Search
CPC .... H04W 72/04; H04W 72/042; H04W 76/27
See application file for complete search history.

(56) References Cited

U.S. PATENT DOCUMENTS

| 9,247,575 B2 | 1/2016 | Rayavarapu | |
| 2018/0343653 A1* | 11/2018 | Guo | H04L 5/0053 |
| 2019/0239093 A1* | 8/2019 | Zhang | H04L 5/001 |
| 2019/0260484 A1* | 8/2019 | Nam | H04L 5/0048 |
| 2019/0260524 A1* | 8/2019 | Nam | H04L 5/0005 |

(Continued)

OTHER PUBLICATIONS

CMCC, "Discussion on remaining issues for unicast PDCCH in CORESET#0," R1-1806361, 3GPP TSG RAN WG1 Meeting 93, Busan, Korea, dated May 21-25, 2018, 4 pages.

(Continued)

*Primary Examiner* — Chi Ho A Lee
(74) *Attorney, Agent, or Firm* — Fish & Richardson P.C.

(57) ABSTRACT

Provided are a method for determining a transmission configuration indicator (TCI) for a terminal in a wireless communication system and a device employing the method. The method comprises: receiving a radio resource control (RRC) signal including a plurality of TCI states; receiving a medium access control (MAC) control element (CE) indicating a TCI state among the plurality of TCI states; and determining a TCI relating to a control resource set (CORESET) on the basis of the RRC signal and the MAC CE.

9 Claims, 26 Drawing Sheets

(56) References Cited

U.S. PATENT DOCUMENTS

| | | | | |
|---|---|---|---|---|
| 2019/0273637 | A1* | 9/2019 | Zhang | H04B 5/0031 |
| 2019/0281587 | A1* | 9/2019 | Zhang | H04L 5/0044 |
| 2019/0297640 | A1* | 9/2019 | Liou | H04W 72/1215 |
| 2019/0313429 | A1* | 10/2019 | Cheng | H04W 48/12 |
| 2019/0373450 | A1* | 12/2019 | Zhou | H04W 48/12 |
| 2020/0221428 | A1* | 7/2020 | Moon | H04L 5/00 |
| 2020/0280409 | A1* | 9/2020 | Grant | H04L 5/0044 |
| 2020/0359448 | A1* | 11/2020 | Takeda | H04W 72/04 |

OTHER PUBLICATIONS

Ericsson, "Remaining issues of PDCCH," R1-1807246, 3GPP TSG-RAN WG1 Meeting #93, Busan, Korea, dated May 21-25, 2018, 4 pages.

Ericsson, "Remaining issues on beam measurement and reporting," R1-1806217, 3GPP TSG-RAN WG1 Meeting #93, Busan, Korea, dated May 21-25, 2018, 13 pages.

LG Electronics, "Clarification on PDCCH beam indication by higher-layers," R1-1802194, 3GPP TSG RAN WG1 Meeting #92, Athens, Greece, dated Feb. 26-Mar. 2, 2018, 2 pages.

LG Electronics, "Remaining issues on PDCCH structure," R1-1806615, 3GPP TSG RAN WG1 Meeting #93, Busan, Korea, dated May 21-25, 2018, 4 pages.

MediaTek Inc., "Remaining Issues on PDCCH Structure," R1-1806778, 3GPP TSG RAN WG1 Meeting #93, Busan, Korea, dated May 21-25, 2018, 2 pages.

Extended European Search Report in European Appln. No. 19804588.2, dated Jul. 1, 2020, 9 pages.

Vivo, "Remaining issues on beam measurement and reporting," R1-1806044, 3GPP TSG RAN WG1 Meeting #93, Busan, Korea, May 21-25, 2018, 5 pages.

CMCC, "Discussion on remaining issues for unicast PDCCH in CORESET#0", R1-1806361, 3GPP TSG RAN WG1 Meeting 93, Busan, Korea, May 21-25, 2018, 4 pages.

Ericsson, "Remaining issues on beam measurement and reporting", R1-1806217, 3GPP TSG-RAN WG1 Meeting #93, Busan, Korea, May 21-25, 2018, 13 pages.

LG Electronics, "Clarification on PDCCH beam indication by higher-layers", R1-1802194, 3GPP TSG RAN WG1 Meeting #92, Athens, Greece, Feb. 26-Mar. 2, 2018, 2 pages.

NTT Docomo, Inc., "Remaining issues on RLM for mobility management", R1-1807056, 3GPP TSG RAN WG1 Meeting #93, Busan, Korea, May 21-25, 2018, 5 pages.

Panasonic, "QCL related issues during BWP switching", R1-1806390, 3GPP TSG-RAN WG1 Meeting #93, Busan, Korea, May 21-25, 2018, 3 pages.

Qualcomm Incorporated, "Remaining Details on QCL", R1-1807351, 3GPP TSG-RAN WG1 Meeting #93, Busan, Korea, May 21-25, 2018, 10 pages.

Sony, "Remaining issues on downlink beam management", R1-1804593, 3GPP TSG-RAN WG1 #92bis, Sanya, China, Apr. 16-20, 2018, 5 pages.

Ericsson, "Feature lead summary 3 for beam measurement and reporting," R1-1807782, 3GPP TSG-RAN WG1 Meeting #93, Busan, May 21-25, 2018, 41 pages.

Huawei, HiSilicon, "Introducing MAC CEs for NR MIMO," R2-1801948, 3GPP TSG-RAN WG2 Meeting #101, Athens, Greece, Feb. 26-Mar. 2, 2018, 10 pages.

Japanese Office Action in JP Appln. No. 2020-517123, dated Mar. 30, 2021, 9 pages (with English translation).

* cited by examiner

METHOD FOR DETERMINING TRANSMISSION CONFIGURATION INDICATOR FOR TERMINAL IN WIRELESS COMMUNICATION SYSTEM AND DEVICE USING SAME METHOD

CROSS-REFERENCE TO RELATED APPLICATIONS

This application is a National Stage application under 35 U.S.C. § 371 of International Application No. PCT/KR2019/005937, filed on May 17, 2019, which claims the benefit of U.S. Provisional Applications No. 62/673,114 filed on May 17, 2018, No. 62/675,140 filed on May 22, 2018 and No. 62/680,528 filed on Jun. 4, 2018. The disclosures of the prior applications are incorporated by reference in their entirety.

BACKGROUND OF THE DISCLOSURE

Field of the Disclosure

The present disclosure relates to wireless communication and, more particularly, to a method for determining a Transmission Configuration Indicator of a terminal and a device for using the method in a wireless communication system.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience. NR is also called the fifth generation (5G) system.

In NR, a terminal may receive a control signal using time/frequency resource which is called a control resource set (CORESET), which is a part of system bandwidth. A terminal may require information which is called 'transmission configuration indicator (TCI) state' for receiving the CORESET. The TCI state may include information for determining a reception beam of the CORESET, for example, information informing quasi co-location (QCL) relation between reference signals in a reference signal set and a demodulation reference signal (DMRS) port. NR requires a method for configuring such a TCI state for a terminal.

In addition, it may be inefficient or unavailable to apply the same TCI state configuration method for all CORESETs having different properties. For example, a specific CORESET may be configured by a broadcast channel, but another CORESET may be configured through a terminal-specific channel. Furthermore, configuration schemes, amounts of information, and the like may be different between configuration information required for a configuration of the specific CORESET and configuration information required for a configuration of another CORESET. Considering such factors, it is required a method for informing a TCI state to a terminal, a method for a terminal to determine a TCI, and the like.

SUMMARY OF THE DISCLOSURE

The present disclosure is to provide a method for determining a Transmission Configuration Indicator of a terminal and a device for using the method in a wireless communication system.

In one aspect, provided is a method for determining a transmission configuration indicator (TCI) of a user equipment (UE) in a wireless communication system. The method includes receiving a radio resource control (RRC) signal including a plurality of TCI states, receiving a medium access control (MAC) control element (CE) informing one TCI state among the plurality of TCI states and determining a TCI for a control resource set (CORESET) based on the RRC signal and the MAC CE.

The RRC signal may be a first RRC signal including TCI states related to a physical downlink shared channel (PDSCH) or a second RRC signal including TCI states related to a physical downlink control channel (PDCCH).

The TCI states related to the PDCCH included in the second RRC signal may be a subset of the TCI states related to the PDSCH included in the first RRC signal.

Based on the CORESET being a specific CORESET, the MAC CE may inform one TCI state among the TCI states related to the PDSCH, and based on the CORESET not being the specific CORESET, the MAC CE may inform one TCI state among the TCI states related to the PDCCH.

The first RRC signal may include 64 TCI states related to the PDSCH.

In another aspect, provided is a user equipment (UE). The UE includes a transceiver for transmitting and receiving a radio signal and a processor operating with being connected to the transceiver. The processor is configured to: receive a radio resource control (RRC) signal including a plurality of TCI states, receive a medium access control (MAC) control element (CE) informing one TCI state among the plurality of TCI states and determine a TCI for a control resource set (CORESET) based on the RRC signal and the MAC CE.

The RRC signal may be a first RRC signal including TCI states related to a physical downlink shared channel (PDSCH) or a second RRC signal including TCI states related to a physical downlink control channel (PDCCH).

The TCI states related to the PDCCH included in the second RRC signal may be a subset of the TCI states related to the PDSCH included in the first RRC signal.

The CORESET being a specific CORESET, the MAC CE may inform one TCI state among the TCI states related to the PDSCH, and the CORESET not being the specific CORESET, the MAC CE may inform one TCI state among the TCI states related to the PDCCH.

The first RRC signal may include 64 TCI states related to the PDSCH.

The UE may communicate with at least one of a mobile terminal, a network and an self-driving vehicle except the UE.

In still another aspect, provided is a processor for a wireless communication device in a wireless communication system. The processor controls the wireless communication device configured to: receive a radio resource control (RRC) signal including a plurality of TCI states, receive a medium access control (MAC) control element (CE) informing one TCI state among the plurality of TCI states and determine a TCI for a control resource set (CORESET) based on the RRC signal and the MAC CE.

The RRC signal may be a first RRC signal including TCI states related to a physical downlink shared channel (PDSCH) or a second RRC signal including TCI states related to a physical downlink control channel (PDCCH).

The TCI states related to the PDCCH included in the second RRC signal may be a subset of the TCI states related to the PDSCH included in the first RRC signal.

The CORESET being a specific CORESET, the MAC CE may inform one TCI state among the TCI states related to the PDSCH, and the CORESET not being the specific CORESET, the MAC CE may inform one TCI state among the TCI states related to the PDCCH.

The present disclosure provides a TCI configuration method for a CORESET, a TCI determination method of a CORESET in an aspect of a terminal, and the like in a system in which a CORESET is introduced like in NR. In addition, TCI configuration/determination methods may be changed considering a property of CORESET, and accordingly, a TCI may be efficiently configured/determined.

DESCRIPTION OF EXEMPLARY EMBODIMENTS

Figure 1:
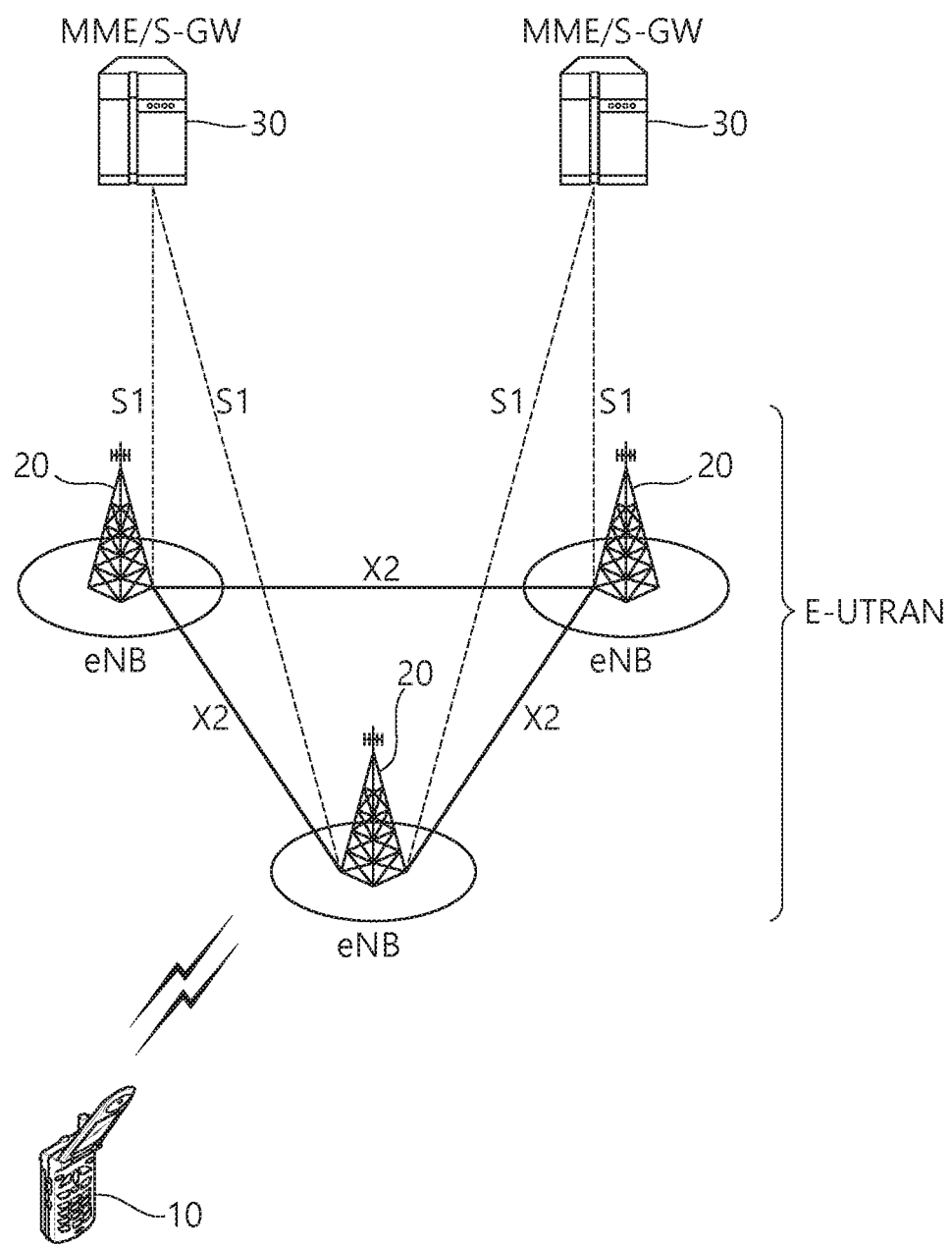
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
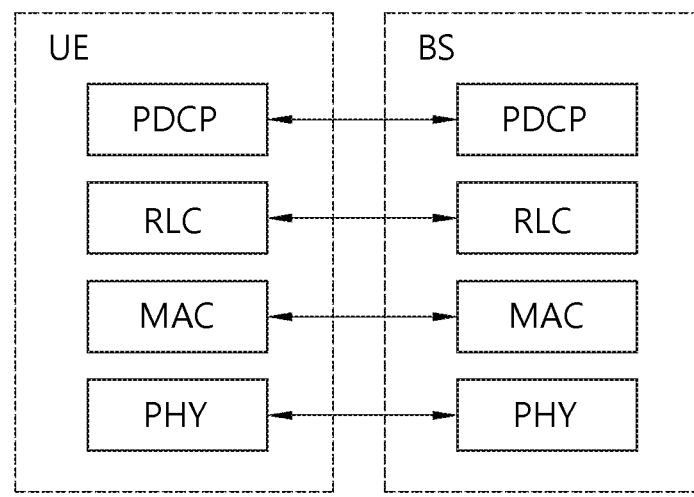
FIG. 2 is a diagram showing a wireless protocol architecture for a user plane.
Figure 3:
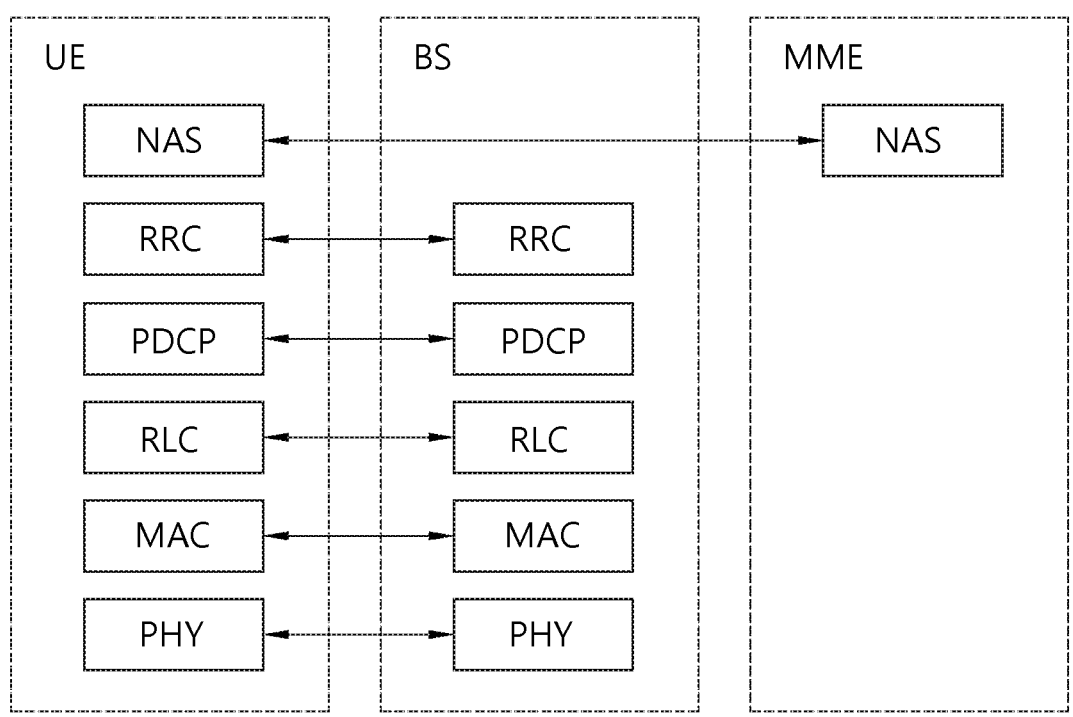
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer(=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
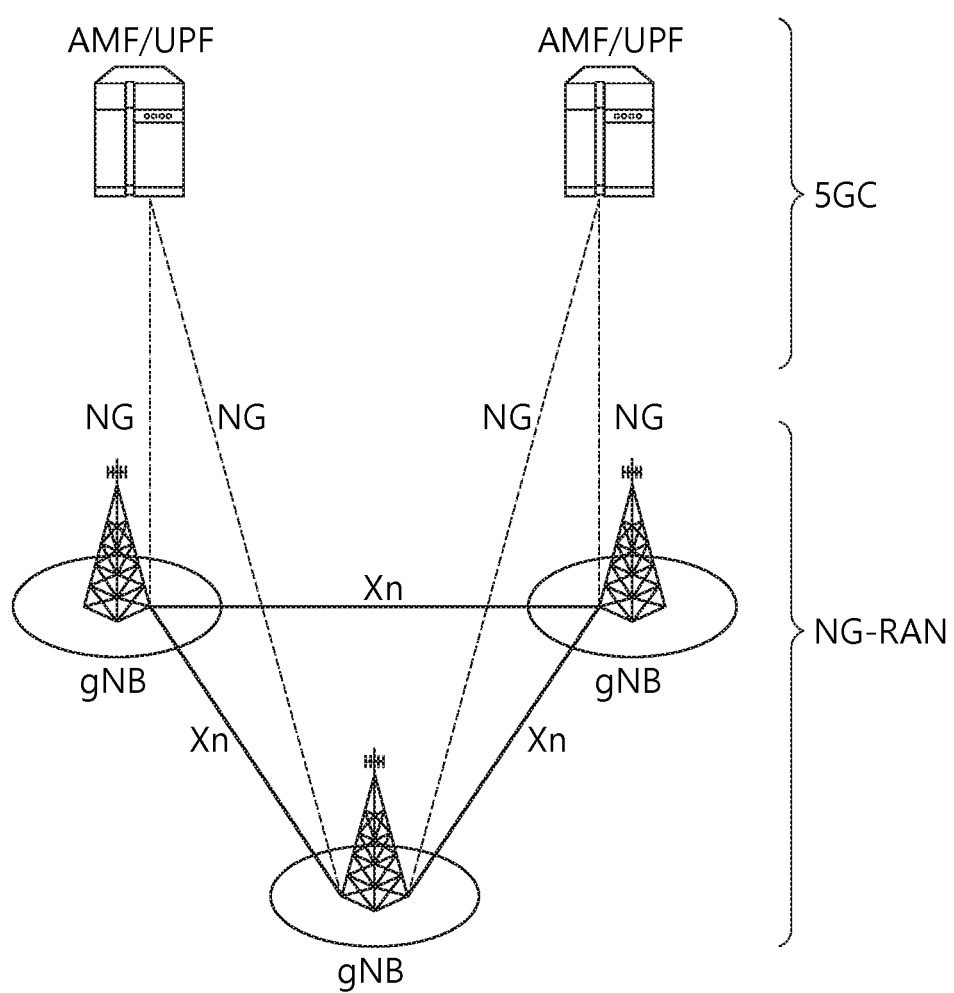
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
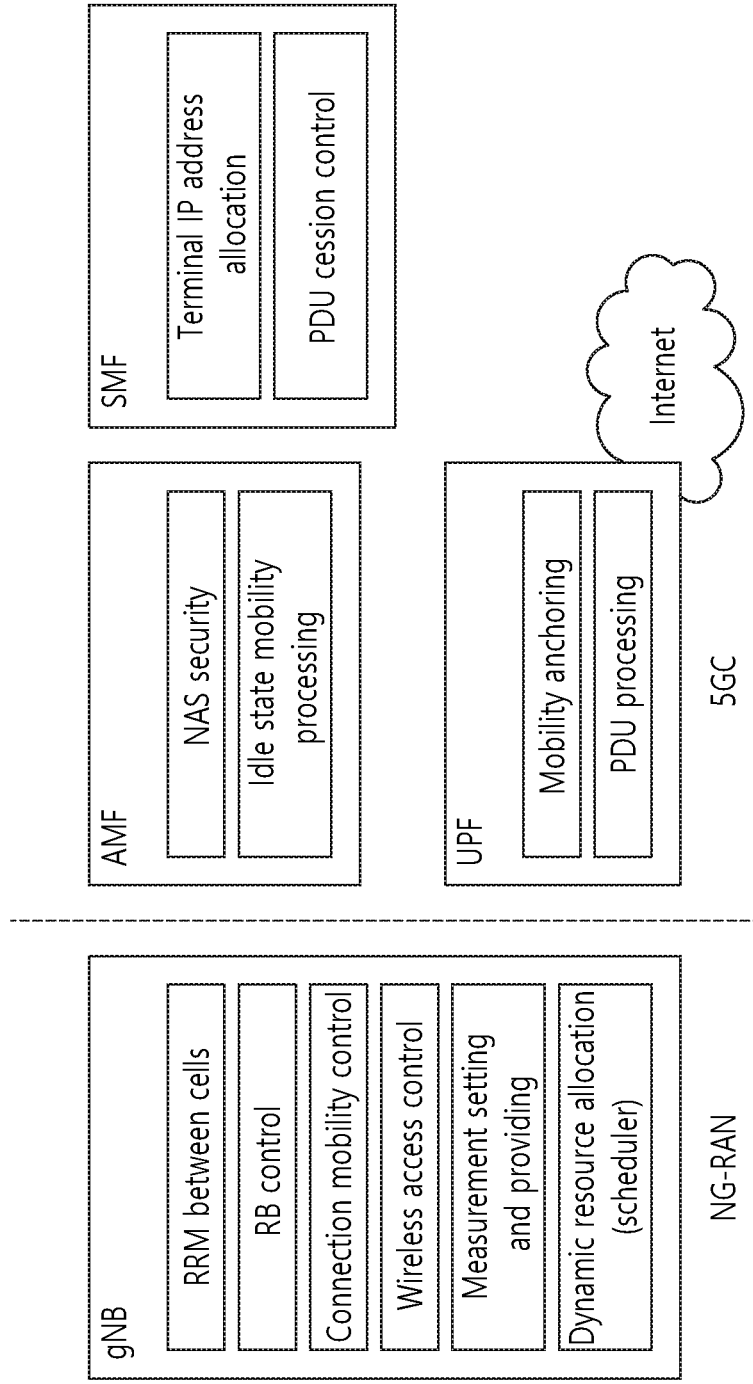
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
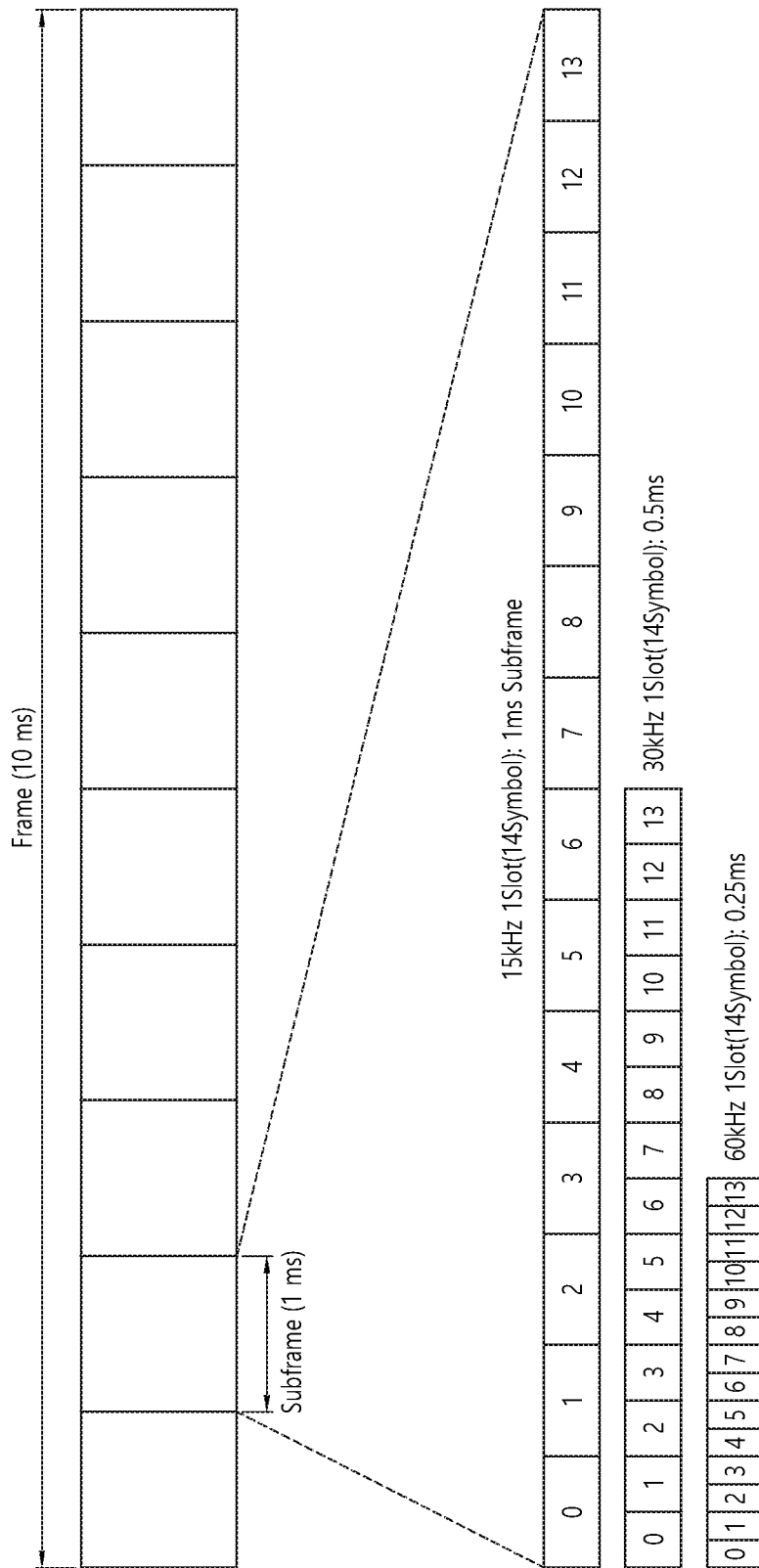
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration $\mu$.

TABLE 1

| μ | $\Delta f = 2^\mu \cdot 15$[kHz] | Cyclic prefix |
| --- | --- | --- |
| 0 | 15 | Normal |
| 1 | 30 | Normal |
| 2 | 60 | Normal |
| 3 | 120 | Extended normal |
| 4 | 240 | normal |

The following table 2 illustrates the number of slots in a frame ($N^{frame,\mu}_{slot}$), the number of slots in a subframe ($N^{frame,\mu}_{slot}$), the number of symbols in a slot ($N^{slot}_{symb}$), and the like, according to subcarrier spacing configurations μ.

TABLE 2

| μ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
| --- | --- |
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
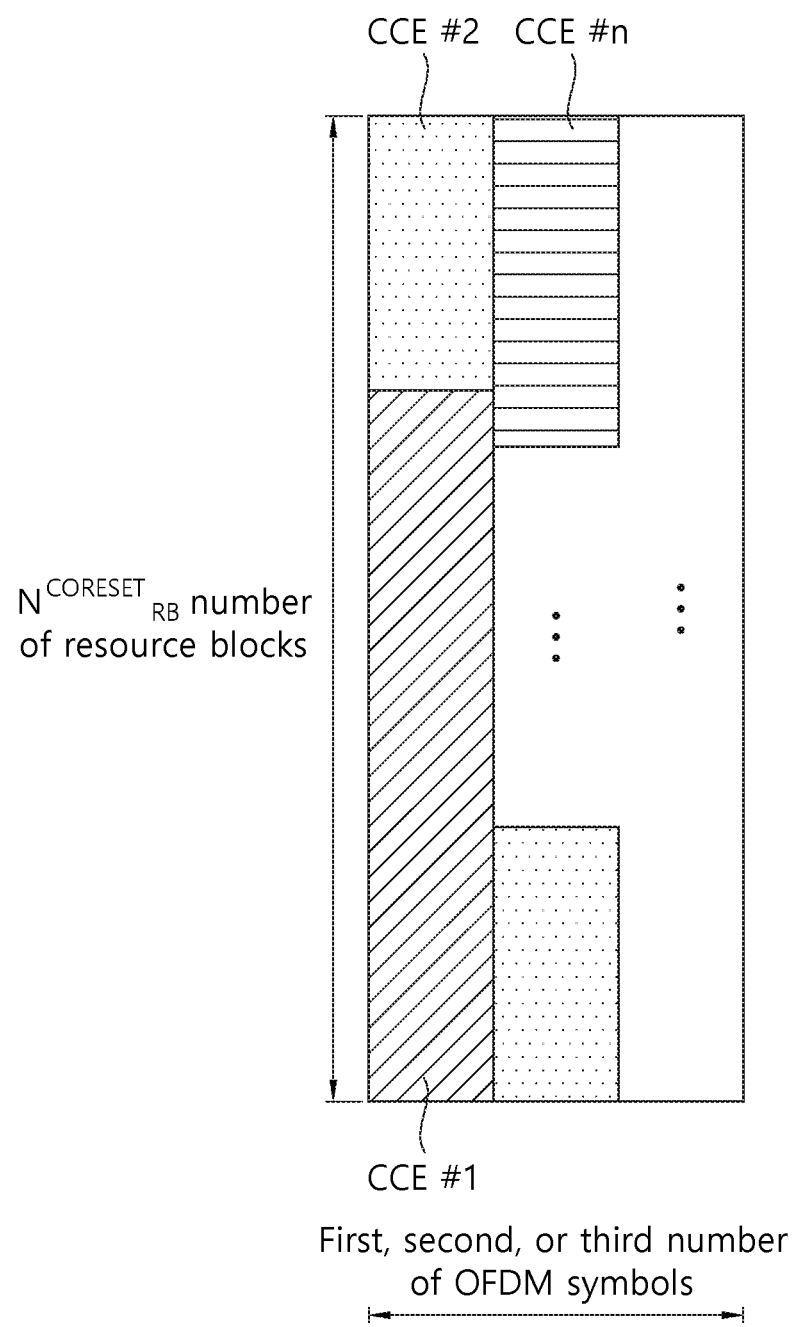
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 8:
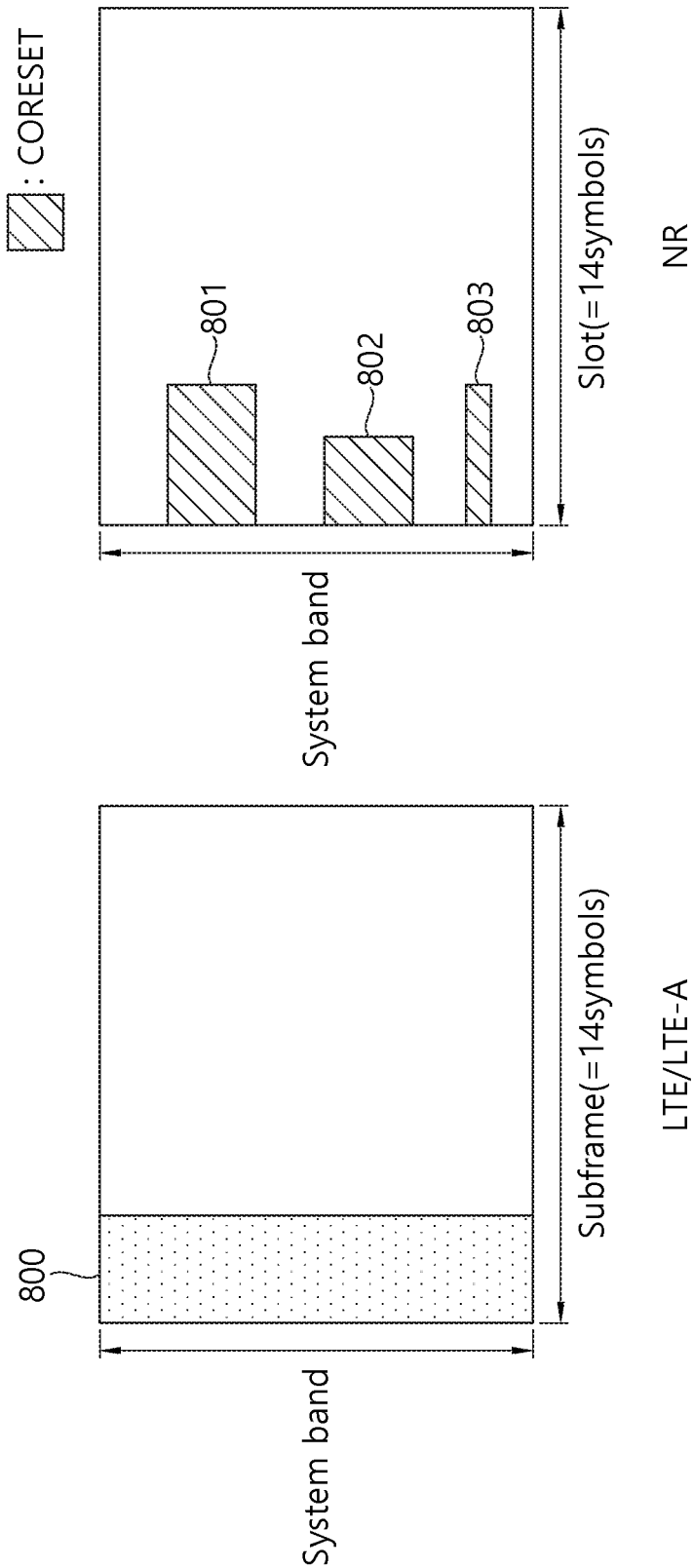
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
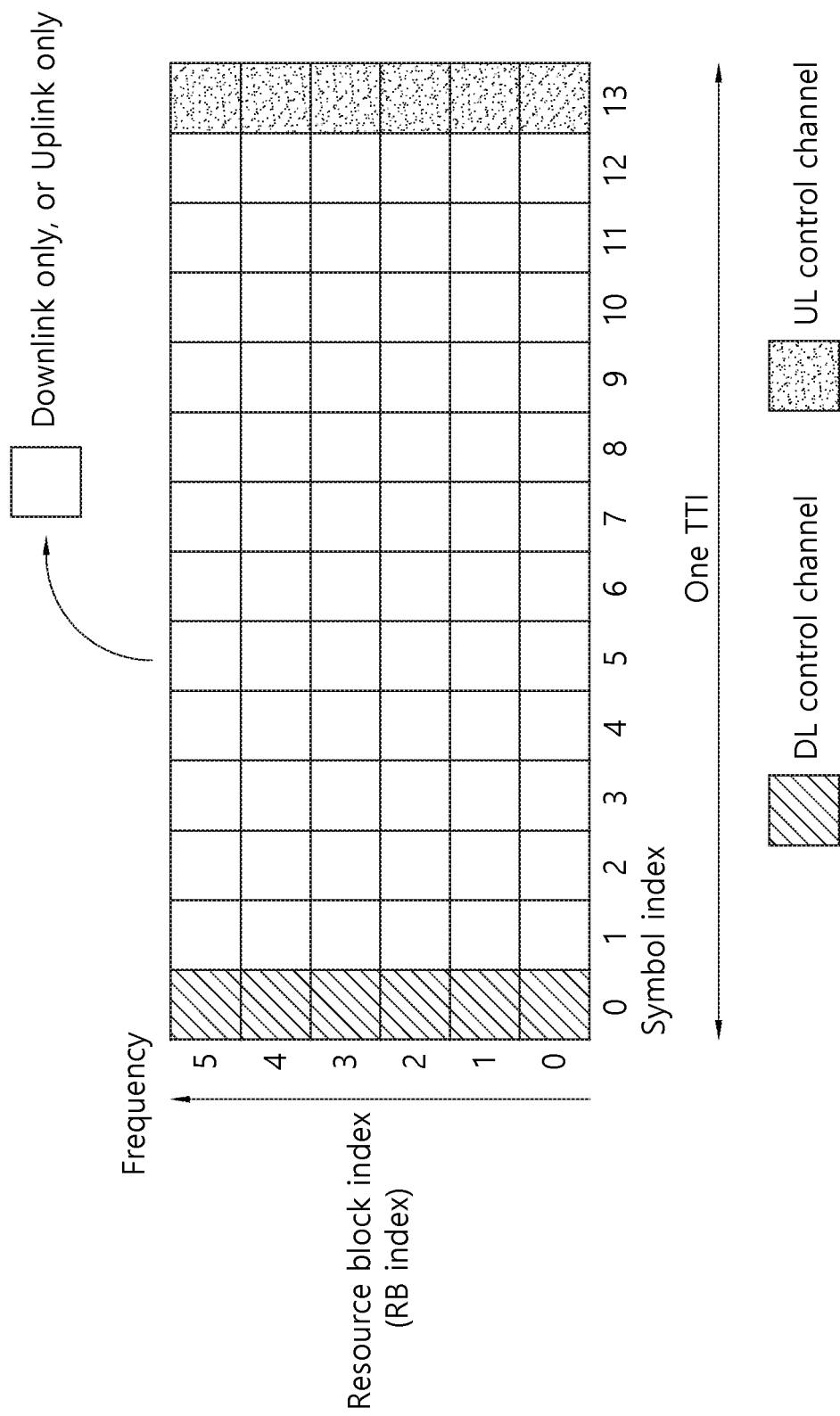
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
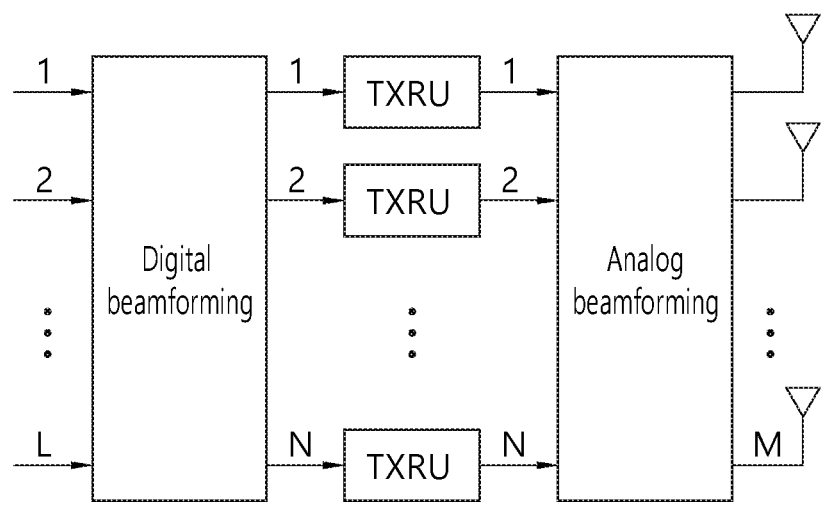
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 7, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
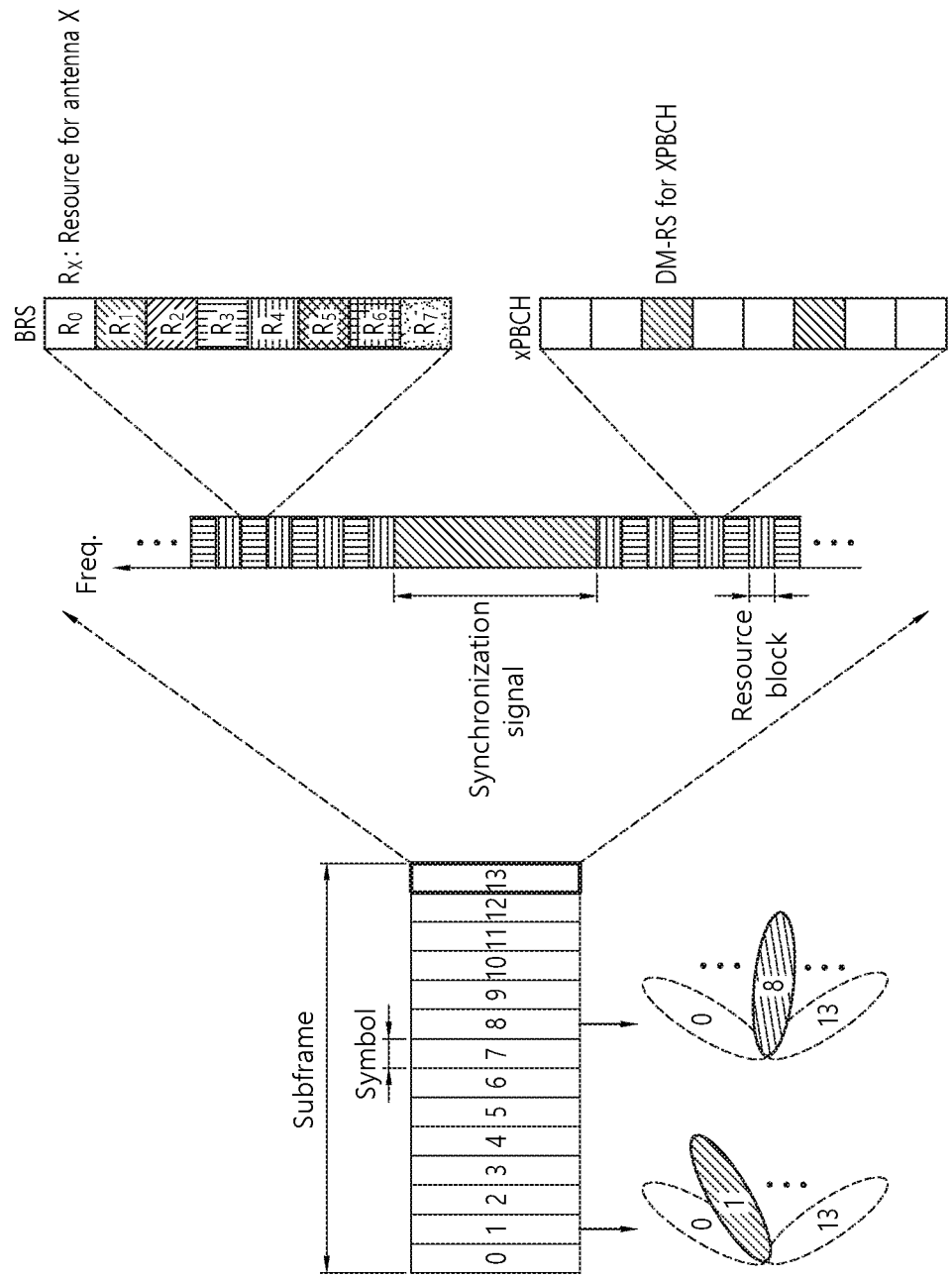
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successfully receive the synchronization signal or xPBCH.

In NR, a synchronization signal block (SSB(=synchronization signal and physical broadcast channel(PBCH)) may be composed of four OFDM symbols in the time domain, numbered in the ascending order from 0 to 3 within the SSB; and a primary synchronization signal (PSS), secondary synchronization signal (SSS), and PBCH associated with demodulation reference signal (DMRS) may be mapped to the symbols. Here, a synchronization signal block may be termed as an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, transmission and reception based on beam can be performed. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a Transmission Configuration Indicator (hereinafter, TCI) state is described. The TCI state may be configured for each CORESET of a control channel and used as a parameter for determining a reception (Rx) beam of a UE.

For each DL BWP of a serving cell, a UE may be configured with three or less CORESETs. In addition, for each CORESET, the UE may be provided with the following information.

1) CORESET index p (e.g., one of 0 to 11, an index of each CORESET may be uniquely determined in the BWPs of a single serving cell), 2) PDCCH DM-RS scrambling sequence initialization value, 3) Period of CORESET in time domain (may be given in a symbol unit), 4) Resource block set, 5) CCE-to-REG mapping parameter, 6) Antenna port quasi co-location representing quasi co-location (QCL) information of a DM-RS antenna port for a PDCCH reception in each CORESET (from a set of antenna port quasi co-locations proved by a higher layer parameter which is called 'TCI-State'), 7) Indication whether a transmission configuration indication (TCI) field is present for a specific DCI format which is transmitted by a PDCCH in a CORESET, and the like.

Here, 'TCI-State' parameter is associated with a QCL type (QCL types A, B, C and D are present. Refer to Table 4) that corresponds to one or two downlink reference signals.

TABLE 4

| QCL Type | Description |
| --- | --- |
| QCL-TypeA | Doppler shift, Doppler spread, average delay, delay spread |
| QCL-TypeB | Doppler shift, Doppler spread |
| QCL-TypeC | Doppler shift, average delay |
| QCL-TypeD | Spatial Rx parameter |

Each 'TCI-State' may include a parameter for configuring quasi co-location relation between one or two downlink reference signals and a DM-RS port of a PDSCH.

Meanwhile, in the case of a CORESET of which index is 0, a UE may assume that a DM-RS antenna port for PDCCH reception of the CORESET is quasi co-located with i) one or more downlink reference signals configured by a TCI state indicated by an MAC CE activation command for the CORESET, or ii) SS/PBCH block identified by a UE during the most recent random access procedure which is not initiated by a PDCCH command that triggers a non-contention based random access procedure (unless the UE does not receive the MAC CE activation command indicating the TCI state for the CORESET after the most recent random access procedure).

For the CORESET of which index is not 0, in the case that a UE is provided with a single TCI state for the CORESET or a UE receives the MAC CE activation command for one of the TCI states provided for the CORESET, the UE may assume that the DM-RS antenna port related to a PDCCH reception in the CORESET is in quasi co-location with one or more downlink reference signals which are configured by the TCI state. In the case of the CORESET having an index 0, a UE may expect that QCL-TypeD of a CSI-RS in the TCI state indicated by the MAC CE activation command for the CORESET is provided by SS/PBCH block.

In the case that the UE receives the MAC CE activation command for one of the TCI states, the UE may apply the activation command after 3 msec of the slot for transmitting the HARQ-ACK information for a PDSCH that provides the activation command. The activation BWP may be defined as an activation BWP in the slot when the activation command is applied.

In each DL BWP configured for a UE in a serving cell, the UE may be provided with 10 or less search space sets. For each search space set, the UE may be provided with at least one of the following information.

1) Search space set index s (0≤s<40), 2) Association between CORESET P and search space set s, 3) PDCCH monitoring period and PDCCH monitoring offset (slot unit), 4) PDCCH monitoring pattern in a slot (e.g., indicating the first symbol of the CORESET in a slot for PDCCH monitoring), 5) The number of slots in which search space set s is existed, 6) The number of PDCCH candidates for each CCE aggregation level, and 7) Information indicating whether search space set s is CSS or USS, and the like.

In NR, CORESET #0 may be configured by PBCH (or UE-dedicated signaling for handover or PSCell configuration or BWP configuration). The search space (SS) set #0 configured by a PBCH may have different monitoring offsets (e.g., slot offset, symbol offset) for every associated SSB. This may be necessary for minimizing a search space occasion that the UE needs to monitor. Alternatively, this may be necessary in the meaning of providing beam sweeping control/data region that may transmit control/data according to each beam so as to communicate with the UE persistently in the situation that the best beam of the UE is dynamically changed.

Figure 12:
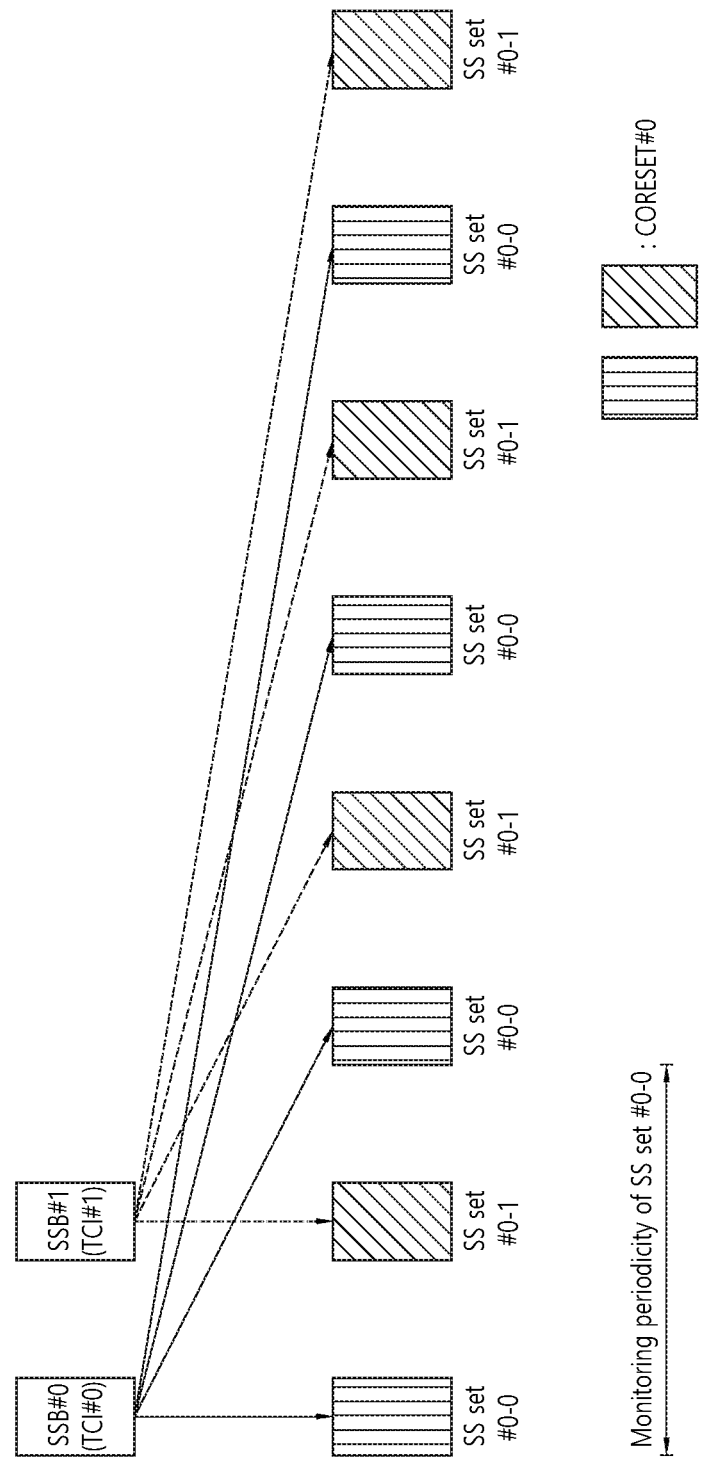
FIG. 12 illustrates an association between SSB, CORESET #0 and search space set (SS set).

FIG. 12 illustrates an association between SSB, CORESET #0 and search space set (SS set).

Referring to FIG. 12, CORESET #0 may be a CORESET for monitoring DCI that transfers Remaining system information (RMSI) scheduling information. Among the CORESET configurations for CORESET #0, a position and a size in a frequency domain, a duration in a time domain, and the like may be configured by a PBCH. It is a characteristic of CORESET #0 that the remaining CORESET configurations are fixed for most cases.

In addition to the RMSI, other system information (OSI), paging, common search space (CSS(s)) for random access may be allocated to CORESET #0 and may also be used for the purpose of transmitting a UE-specific search space (USS) or a UE-dedicated PDCCH. In the case that a search space set for OSI, paging and random access is separately configured, the corresponding search space set may use different search space index.

As another characteristic of CORESET #0, an explicit configuration for Transmission configuration indication (TCI) state may not be existed. As described above, the TCI state may mean information required for a UE to configure a reception beam in NR. The TCI state in CORESET #0 may be determined by SSB in which the corresponding CORESET/search space set is associated. CORESET #0 and search space set #0 which are associated for each SSB may be existed. Each UE may perform a measurement for each SSB and monitor CORESET #0/search space set #0 associated with the corresponding SSB based on the PBCH information of the SSB of which measurement result is the best. FIG. 12 denotes search space set #0-0, search space set #0-1, and the like for distinguishing search space set #0 by different SSBs. In the search space set #0-X, X means the associated SSB index.

In addition, in NR, even in the region configured for common search space (CSS) use in CORESET #0, the UE-dedicated PDSCH scheduling information may be transmitted. In this case, the UE needs to perform monitoring for the corresponding DCI. For example, the following operations are available.

1) QCL Assumption for Broadcast/Non-Broadcast PDCCH i) A network and a UE maintain the same understanding for SSB/CORESET #0/SS #0 in a connected mode for at least non-broadcast PDCCH. ii) For broadcast PDCCH, it may be a matter of UE implementation based on which SSB the common search space needs to be monitored in all of connected mode, non-activation mode and idle mode. iii) Unicast PDSCH may be scheduled by DCI related to CORESET #0.

2) UE-Dedicated (Unicast, Non-Broadcast) DCI Monitoring in a Common Search Space i) In the case of the common search space configured as RMSI-PDCCH-Config, osi-searchSpace, paging-searchSpace and ra-searchSpace, DCI format 0_0/1_0 in which C-RNTI is used may be monitored on non-DRX timing after the C-RNTI may be usable.

ii) In the case of the common search space configured as RMSI-PDCCH-Config, osi-searchSpace, paging-searchSpace and ra-searchSpace, DCI format 0_0/1_0 in which CS-RNTI is used may be monitored on non-DCX timing after the CS-RNTI may be usable.

That is, a UE may be configured with a search space set configuration for each target by PBCH (i.e., RMSI-PDCCH-Config), RMSI (i.e., osi-searchSpace, paging-searchSpace, and ra-searchSpace), and the like. In the corresponding search space set and CORESET, DCI format 0_0/1_0 scrambled with C-RNTI/CS-RNTI may be monitored in addition to the signal which is targeted. In addition, the monitoring for broadcast PDCCH may be performed for the search space set (e.g., search space set #0-0 or search space set #0-1 in FIG. 12) selected by the UE. On the other hand, for non-broadcast PDCCH, a monitoring should be performed in the search space set selected based on the same understanding between a network and a UE. For example, in the case that a network expects that a UE monitors in search space set #1 but the UE performs monitoring in search space set #2, a misunderstanding occurs between the network and the UE. This is inefficient since the network may repeatedly transmit the corresponding PDCCH to all search space set associated with each SSB when the same understanding for non-broadcast (or unicast) PDCCH monitoring is not present. Alternatively, the same understanding for both of broadcast/non-broadcast may be required in a specific mode in order to perform a monitoring for broadcast PDCCH and non-broadcast PDCCH simultaneously.

The present disclosure proposes a method for performing the operation described above as below.

[TCI Update of TCI-Less CORESET]

The non-broadcast PDCCH may be used for fallback DCI, and the like, and this may be monitored even in the common search space (CSS). A CORESET may be divided into a CORESET with TCI state and a CORESET without TCI state according to a TCI state in NR.

The CORESET without TCI state may be divided into a beam sweeping CORESET and a non-beam sweeping CORESET according to beam sweeping. The beam sweeping CORESET may mean a CORESET that derives a TCI state from an associated SSB like CORESET #0. In this case, a TCI update may be performed by a RACH procedure or a network signaling (e.g., signaling by RRC, MAC CE, etc.). The non-beam sweeping CORESET may mean a CORESET of which TCI state is defined by a RACH procedure or a network signaling (e.g., RRC signal or MAC CE) although the CORESET configuration does not include a TCI state. In the present disclosure, a TCI update operation of the CORESET without TCI state is proposed as below.

1. Operation for Beam Sweeping CORESET

A. In the case that a TCI update for the beam sweeping CORESET without TCI state is occurred by a RACH procedure or a network signaling, a UE may perform a monitoring in a search space set which is associated with an updated TCI state. This may mean that a monitoring offset (e.g., slot offset and symbol offset) of the corresponding search space set is changed by the TCI update (however, a CORESET may not be changed), and a reception beam may be configured by assuming the updated TCI in the changed monitoring occasion.

B. For example, the UE in FIG. 12 may perform a monitoring for DCI in CORESET #0/search space set #0-0 associated with SSB #0 which is selected through an initial access, and the like. Later, in the case that a TCI state is changed from 0 to 1 by an additional RACH procedure or network signaling, the UE may perform a monitoring for the corresponding DCI in CORESET #0/search space set #0-1.

2. Operation for Non-Beam Sweeping CORESET

A. In the case that a TCI state of a CORESET having the TCI state is updated, when a UE performs a monitoring in a search space set(s) associated with the corresponding CORESET, the UE may perform a monitoring after configuring a reception beam based on the updated TCI. In this case, the TCI update may be performed based on a RACH procedure which is performed the most recently or the TCI update which is received the most recently, or the TCI update may be determined by the procedure performed the most recently among a RACH and a signaling (RRC or MAC CE). Alternatively, a specific update method (or updatable TCI format (e.g., SSB or CSI-RS)) may be defined for each CORESET. For example, for a BFR CORESET used for a beam failure recovery (BFR), only the TCI update by a RACH procedure or a TCI update of SSB type may be regarded as a valid update.

B. A format of an updated TCI may be changed according to a type of CORESET. For example, for each CORESET, it may be defined i) CORESET that allows only a TCI state associated with SSB and ii) CORESET that allows only a TCI state associated with CSI-RS port. As an example, in the case that the existing TCI state is associated with SSB, it is assumed and applied that only the TCI state associated with SSB is valid. As another example, a type of valid TCI may be determined depending on a purpose or DCI format, or RNTI of the monitoring which is performed in the corresponding CORESET.

[Non-Broadcast PDCCH Monitoring in a Common Search Space (CSS)]

As described above, a non-broadcast (or unicast) PDCCH may be monitored in a CSS, and for the non-broadcast PDCCH, it is preferable that the same understanding is presumed, which is related to a TCI of a network and a UE.

In NR, CORESET #0 may be used for receiving RMSI, OSI, paging, random access response (RAR), DCI format 0_0/1_0, USS, and the like. The information may be distinguished into group 1 (RMSI, OSI and paging) and group 2 (RAR, DCI format 0_0/1_0 and USS) according to a reception method or a TCI application method of a UE. It may be preferable for group 1 to perform a monitoring in the beam sweeping CORESET since a plurality of UEs receives common information with a broadcast PDCCH. Since the same understanding for a TCI between a network and a UE is required with a non-broadcast PDCCH, it is preferable for group 2 to perform a monitoring in the CORESET in which a TCI update is available by a RACH or a network signaling.

However, as described above, both group 1 and group 2 may be monitored in CORESET #0. Accordingly, in the present disclosure, a TCI application method of CORESET #0 may be differently configured according to a type of information which is monitored, a DCI format or a search space set type. Additionally, a TCI update method may be differently applied according to the search space set type which is associated with CORESET #0.

For example, in search space set #0 associated with CORESET #0, a monitoring for RMSI, OSI and paging may be performed, and in search space set #1, a monitoring for RAR, DCI format 0_0/1_0 (by C-RNTI) and USS may be performed. At this time, in search space set #0, beam sweeping is available, and the same information may be repeatedly transmitted by each beam. Therefore, a UE may perform a monitoring in a monitoring occasion of search space set #0 which is associated with SSB of the corresponding TCI based on the most preferred TCI of the UE in the monitoring occasion. That is, for search space set #0, it may be assumed that a TCI update signaling of a network is not performed.

On the other hand, since search space set #1 needs to perform a monitoring for a non-broadcast PDCCH, the TCI state for CORESET #0 in the occasion for monitoring the corresponding search space set needs to be assumed identically between a network and a UE. Accordingly, in the case of monitoring search space set #1 for CORESET #0, a TCI for CORESET #0 may be configured, and a TCI update by a network (or through RACH procedure) may be performed only for search space set #1. In other words, a TCI update method and a monitoring occasion when the updated TCI is applied may be changed according to a search space set or a type of monitored information for CORESET #0.

[Priority of TCI States]

As described above, a TCI state of CORESET #0 may be differently applied according to a search space set.

Figure 13:
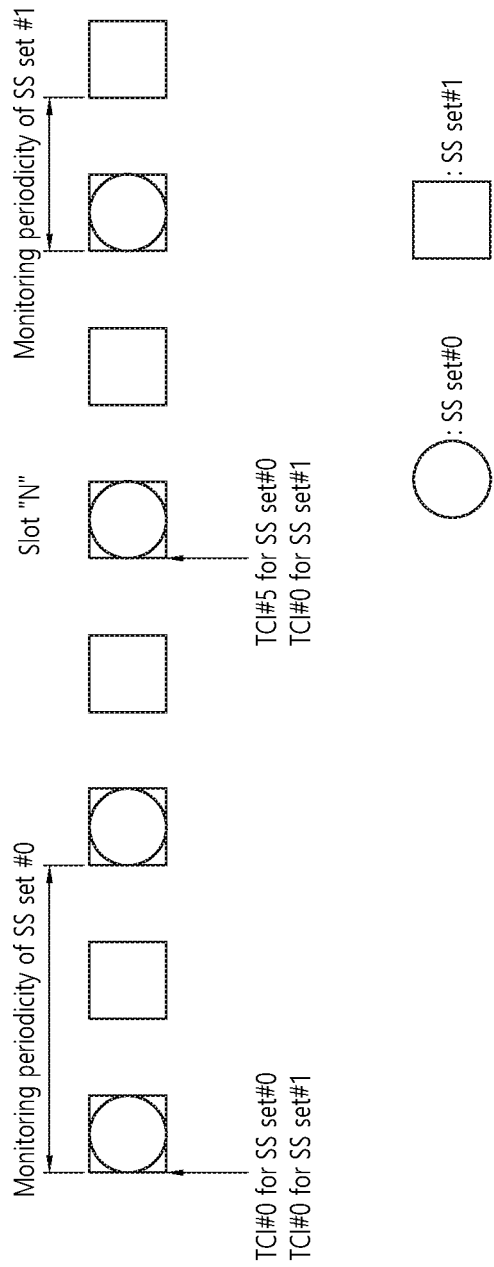
FIG. 13 illustrates the case of assuming that CORESET #0 is applied to search space set and search space set #1, a monitoring for broadcast PDCCH is performed in search space set #0 and a monitoring for non-broadcast PDCCH is performed in search space set #1.

FIG. 13 illustrates the case of assuming that CORESET #0 is applied to search space set and search space set #1, a monitoring for broadcast PDCCH is performed in search space set #0 and a monitoring for non-broadcast PDCCH is performed in search space set #1.

Referring to FIG. 13, the case is shown that it is determined to apply TCI #5 from slot "N" by a UE's decision for search space set (SS set) #0, but TCI #0 needs to be applied in slot "N" since there is no TCI update of a network signaling for search space set #1. In this case, a case may occur that different TCIs are assumed in the same CORESET in the same slot. This may mean that a UE needs to apply two different reception beams or select a single TCI.

In such a case (i.e., search space sets of assuming different TCI states is configured for the same CORESET, and the same monitoring occasion is allocated in the same slot for each search space set), according to the present disclosure, a TCI state which is going to actually apply may be determined based on a type of monitored information or additional signaling information. This may also mean that a monitoring of information to which different TCIs are to be applied may be skipped in the corresponding slot.

In the case that CORESETs (or search space sets) to which different TCIs are configured in the same slot or time domain are overlapped, the following matters may be considered for a priority for a TCI selection (or CORESET for performing a monitoring and/or a selection of search space set).

1. A priority of TCI may be determined according to a type of monitored information.

A. For example, since paging related information among a broadcast PDCCH may be monitored only in a specific window, and the corresponding information may transfer information such as SI update, it is preferable to apply higher priority. Accordingly, in the case that PDCCHs having different TCI states are overlapped, a priority of TCI may be determined in the order of i) paging related PDCCH, ii) non-broadcast PDCCH, and iii) broadcast PDCCH. In the case that SI update is triggered by paging, it is preferable that SI-RNTI has a priority. Accordingly, a priority may be applied in the order of i) SI-RNTI based PDCCH, ii) non-broadcast PDCCH, and iii) P-RNTI based PDCCH (or P-RNTI>non-broadcast PDCCH).

2. Generally, a TCI state for monitoring non-broadcast PDCCH may be applied.

A. In general case, in the case that a reception of broadcast PDCCH is succeeded once, since an update of the information is not required for a long time, the broadcast PDCCH may be required for securing a transmission/reception occasion for non-broadcast PDCCH. Alternatively, in this case, a broadcast PDCCH may be defined to be monitored in a monitoring occasion of assuming different TCI.

B. The case that a TCI state for broadcast PDCCH monitoring has higher priority may be as below.

i. In the case that a change of broadcast PDCCH information is indicated from a network, a TCI of the search space set for monitoring the information may be preferentially applied. For example, a UE that receives a signal that system information is updated may preferentially apply a TCI for a PDCCH monitoring in relation to RMSI and OSI during a predetermined time window from the corresponding timing. The period of window may be predefined or determined by a network signaling, and the like.

ii. A periodicity (and/or window) having high priority may be determined for each broadcast information. For example, system information needs to be received in a predetermined period, and for this, it may be predefined or indicated by a network such that a TCI of CORESET/search space set for performing a monitoring of the system information has the highest priority in every corresponding period. Alternatively, each UE may report a period providing higher priority to the TCI of broadcast PDCCH to a network.

[BD/CE Complexity for Beam Sweeping CORESET]

In NR, a plurality of CORESETs and search space sets may be configured for a UE. Accordingly, it may be predefined a maximum blind decoding (BD) number that may be performed in a slot and a maximum CCE number that may be used for a channel estimation (CE) (hereinafter, referred to a BD/CCE number or BD/CE number) for considering a UE complexity and a processing time in blind decoding (BD) and channel estimation (CE).

In the case that a BD number or a CCE number exceeds a corresponding limit, it may be performed a process of skipping a monitoring for a part of PDCCH candidates in the corresponding slot, and the same understanding for the information for the skipped PDCCH candidate is necessary between a network and a UE.

However, as described above, for a monitoring broadcast PDCCH in a beam sweeping CORESET, a TCI state may be determined by a UE, and BD and CE may be performed in the search space set (monitoring occasion) associated with the corresponding TCI state. This may mean that a network is unable to know information for PDCCH candidate skip of the UE. In order to solve such a problem, the present disclosure proposes a method for calculating BD/CCE number in a beam sweeping CORESET (e.g., CORESET #0) as below. SSB described below may be operated based on the SSB indicated by a common signaling and/or UE-dedicated signaling.

1. Assume that BD is Performed for all Beams

A. For example, for CORESET #0/search space set #0, the number of CORESET #0/search space set #0 is generated as much as the number of SSBs, and each CORESET #0/search space set #0 transmit/receive information based on different TCI states. In this case, as a method of calculating BD/CCE number, it may be considered the BD/CCE number corresponding to broadcast PDCCH monitoring in all slots to which CORESET #0/search space set #0 is allocated.

2. Assume BD/CCE Number in Slots Associated with X SSBs Based on UE Report

A. A UE may report a measurement result for SSB and compare the corresponding BD/CCE number with a limit of the corresponding slot only in the slot in which CORESET #0/search space set #0 associated with X SSBs are monitored.

B. At this time, X value may be predefined or indicated by a network signaling.

3. Method of Selecting SSB Based on a RACH Procedure Performed Most Recently

A. The BD number/CCE number for broadcast PDCCH may be applied only in the slot corresponding to CORESET #0/search space set #0 associated with a TCI state assumed for receiving a RAR in the RACH procedure performed most recently.

B. Alternatively, it is determined that the SSB associated with a TCI state signaled by a network most recently is valid, and only the BD/CCE number corresponding to CORESET #0/search space set #0 associated with the corresponding SSB may be considered.

i. When a TCI state for a PDCCH CORESET is signaled, in the case that the corresponding TCI state is configured based on a CSI-RS port, a network may inform SSB information associated with the corresponding CSI-RS port to a UE. This may be implemented as a method of informing an SSB index associated with each port to a UE for CSI-RS ports configured for a beam management use, and the like.

In the case that CORESETS having different TCI states are overlapped in a time domain, and a monitoring for the whole of a search space set is skipped, it is proposed that the CCE/BD number for the corresponding search space set may not be considered in the corresponding limit.

Additionally, in the case that a UE search space set is dropped, it is proposed assuming that the corresponding UE search space set is not configured in the corresponding slot. This may mean that the corresponding search space set is not applied to the search space set level PDCCH mapping (or drop) which is introduced in NR.

Particularly, in NR, higher priority is provided as a search space set ID decreases, and in the case that a specific search space set is dropped, all of the search space sets having search space set IDs of the number greater than the number of the corresponding search space sets, but the rule is not applied to the search space set which is skipped according to the present disclosure. For example, in the case that UE search space sets #0, #1 and #2 are monitored in the same slot, and UE search space set #1 is skipped by the TCI overlap, only UE search space set #0 and UE search space set #2 may be applied to the search space level monitoring skip.

When a UE is configured with CSS #1 in CORESET #X and configured with CSS #2 in CORESET #Y, a monitoring occasion of CSS #1 and/or CSS #2 according to different configuration may be added to period/monitoring of a search space separately. As an example, a monitoring case may be limited according to a period for SI being transmitted or PO when CSS #x monitors SI-RNTI or P-RNTI. A UE may not know an accurate timing for monitoring SI-RNTI or P-RNTI, and in the case that an ambiguity is occurred between a network and a UE as such, BD/CE budget may be determined by considering all cases that the corresponding monitoring may occur. In the case that there is no ambiguity, BD/CE budget may be determined by considering only the case that a monitoring is actually occurred.

As such, when search space sets considered for BD/CE actually are referred to SS #1, SS #2, . . . , SS #k, and when search space sets that monitor in the corresponding slot (or symbol) according to a TCI state or QCL multiplexing/channel multiplexing rule of a UE are determined to be SS'#1, SS'#2, . . . , SS'#m, BD/CE budget may be determined based on it. Alternatively, without regard to this, BD/CE budget may also be determined based on SS #1, SS #2, . . . , SS #k.

In the case that CSS is configured for several CORESETs, even in the case that the TCI state of a UE is the same, it is unable to monitor USS since the BD/CE budget for monitoring several CORESETs is too big. Accordingly, the CORESET/CSS monitored in a slot may be limited to one. In this case, in the case that an SS for a slot format indication (SFI) is separately configured, it is assumed that it may be separately monitored.

As an example, when CSS #0/0A are mapped to CORESET #0, and CSS #2/CSS #3 are mapped to CORESET #1, it may be assumed that only one of two CORESETs is monitored at a time. At this time, it may be determined which CORESET is selected according to channel/operation priority (e.g., SI update SI-RNTI>C-RNTI, RA-RNTI during random access window) in the corresponding slot. When a single CORESET is selected, in the case that several CSSs are mapped to the single CORESET, it may be operated as below.

1) It may be assumed that all CSSs (SFI-SS may be exceptional) in the single CORESET have the same aggregation level (AL)/candidate set. Alternatively, it is assumed that at least an aggregation level set is in inclusive relation, and the candidate set for a common aggregation level is the same. This is designed for minimizing a CCE which is not overlapped.

2) One or more CSSs may not be configured in a single CORESET. A single CSS may be mapped to several RNTIs, but it is assumed that only one CSS is mapped always. In this case, a restriction may be existed for the case that search spaces for SI-RNTI and RA-RNTI have different monitoring periods.

3) A union of all CSSs may be considered. This may have a disadvantage of increasing channel estimation complexity of a UE.

Hereinafter, the contents of the present disclosure is described through various application examples of the present disclosure. Each embodiment may have additional disclosure.

Example 1

A TCI state configuration of a CORESET may be applied only to USS. The TCI state configuration related to a reception beam configuration of a UE in each CORESET may be configured with being limited to USS. Alternatively, an explicit TCI configuration may be available for the CORESET configured by a UE-specific RRC signaling, and this may be configured or updated by RRC, MAC, RACH, and the like.

CSS (SI-RNTI, P-RNTI, RA-RNTI) may be based on a UE selection. A TCI state of a CORESET associated with CSS (e.g., SI-RNTI, P-RNTI, RA-RNTI) may be configured by a UE selection. This may include a configuration of TCI by a UE autonomous measurement and may also include the case that a UE configures a TCI by a procedure such as RACH (without explicit TCI configuration signaling of a network).

USS may be based on a network configuration. Since a beam sweeping for USS may cause resource waste, it is preferable that a TCI configuration for a CORESET in which USS is configured is configured by a network, and this may be updated by RACH or a network signaling.

For BD/CE, all available SS #0s may be considered. For RA-RNTI, only a random access window may be considered. A UE may calculate a complexity for channel estimation as a BD number and a non-overlapped CCE number in which channel estimation is not performed, respectively.

This may be used as a criterion for determining a search space set, a candidate, and the like for performing a monitoring in the corresponding slot.

SS #0 may have a beam sweeping characteristic, and a UE may monitor the corresponding information by the best beam. In this case, since it may be interpreted that all of each search space sets (SS sets) #0 associated with different SSBs are blind-decoded, this is to propose to count a BD number and a CCE number which are not overlapped in all available search space set #0. However, in the case of the search space set that monitors RA-RNTI, a monitoring starting point and a monitoring window may be determined by a PRACK transmission timing and a network configuration, and since a monitoring is performed only the corresponding region, BD/CCE number counting may be applied to the corresponding region limitedly. This may also be applied to the case of monitoring paging (scrambled by P-RNTI). That is, a monitoring for the corresponding search space set is performed only in the region configured to monitor paging, and the BD/CCE number may be counted.

Different operations may be applied according to modes of a UE. For examples, a UE in an idle mode may count the BD/CCE number in all available search space set #0, and a UE in a connected mode may count the BD/CCE number only in the search space set associated with a TCI state (e.g., SSB index) which is configured by a network and/or determined by a RACH procedure and the like of the UE.

Process when TCI states collide. USS/CSS may be time division-multiplexed (TDMed). Or, a collision occurs, it may follow CSS. USS and CSS may be TDMed generally, and in the case that USS and CSS are overlapped in a time domain, a priority may be determined according to the priority rule described above. For example, in the case that USS and CSS are overlapped, it may be assumed that it follows the TCI state configured by CSS.

TCI Assumption on C-RNTI on CSS.

In a common search space set, a monitoring for a PDCCH scrambled with C-RNTI such as fallback DCI may also be performed. In this case, a UE may also apply the TCI state applied in monitoring the corresponding CSS to C-RNTI monitoring.

Additionally, C-RNTI monitoring in CSS may be performed only in the slot in which the same understanding for TCI between a network and a UE is guaranteed. This may mean that in the case that a network is unable to assure the slot in which a UE performs a monitoring, the C-RNTI monitoring may be skipped in the corresponding slot.

Example 2

A TCI state configuration of a CORESET may be applied only to USS. The TCI of the CORESET to which USS is configured may be determined by a network signaling or a RACH procedure.

CSS (SI-RNTI, P-RNTI, RA-RNTI) may be based on only a RACH procedure. In other words, for CSS, a TCI state may be determined only by the RACH procedure.

For BD/CE, only an associated SS #0 may be considered. For RA-RNTI, only a random access window may be considered.

Process of TCI state collision. USS/CSS may be TDMed. When a collision occurs, it may follow CSS.

Example 3

A TCI state configuration of a CORESET may be applied only to search space(s) having C-RNTI. CSS (SI-RNTI, P-RNTI, RA-RNTI) may be based on a UE selection, and C-RNTI may be based on a network configuration.

For BD/CE, all available SS #0s may be considered. For RA-RNTI, only a random access (RA) window may be considered.

For process of TCI state collision, when C-RNTI is configured, it may be configured to have the highest priority. When it is overlapped, it may follow the TCI of SS which is associated with C-RNTI.

Example 4

A TCI state may be determined for each CORESET. For example, for CORESET #0, a TCI state may be determined based on RRC connection. For all RNTIs, CSS/USS may follow the configured TCI state. When a TCI state is configured, the TCI state may be based only on SSB. A UE may not be allowed to monitor CSS with a beam which is associated with another SSB, not the associated SSB. There may be a restriction for the TCI state configuration (e.g., except for CSI-RS).

When a PDCCH scrambled by C-RNTI needs to be monitored with CSS (or assumed as such), like fallback DCI, it may be assumed that search space set #0 does not perform the corresponding monitoring. This is because, in the case that a UE determines a monitoring occasion arbitrarily in a search space set in which a TCI state is determined by different SSBs like search space set #0, an ambiguity of monitoring occasion may be occurred between a network and a UE. This may mean that a monitoring for C-RNTI is not performed in the search space set in which beam sweeping is applied, and a UE may determine a monitoring occasion according to a preferred beam.

In addition, in the case that a specific search space set is configured and a monitoring window of RNTI monitored in the corresponding search space set is determined (e.g., RAR and paging), BD/CCE counting and C-RNTI monitoring may be applied only in the corresponding window. This may include an operation that, in the case that SI update is configured, an occasion and a window for performing monitoring for SI-RNTI is configured and SI-RNTI is monitored only in the corresponding window.

A UE may report a UE autonomous monitoring occasion for a specific RNTI (e.g., SI-RNTI) to a network. This may mean that a network and a UE assume the same understanding for BD/CCE number counting for the corresponding RNTI monitoring on the corresponding occasion. Alternatively, in the case that a UE performs a monitoring autonomously, that is, in the case that the UE performs a monitoring, which is not defined by a network configuration or predefined, BD/CCE number for the corresponding monitoring may not be counted. This may mean that the UE may count BD/CCE number only in the monitoring occasion by a network configuration or predefined, and other monitoring is performed by the UE autonomously only in the occasion when a monitoring is available (e.g., a slot without a formal monitoring). In addition, this may assume that a monitoring for UE-dedicated signaling (e.g., C-RNTI) is not performed in such an autonomous monitoring occasion.

In the above description, a method of determining a TCI (or QCL) assumption for a CORESET in which a TCI state is not configured is proposed. The present disclosure proposes a method of processing a CORESET in which a TCI state is not configured is proposed in detail below.

<TCI Configuration Method for a CORESET without 'tci-StatesPDCCH'>

In NR, TCI related information in a CORESET may be defined as below. In the case that the following parameter "tci-StatesPDCCH" includes a plurality of TCI states, it may be informed that one of a plurality of TCI states is selected for the TCI information to which a CORESET is applied by MAC CE signaling. In the case that only a single TCI state is configured in the following parameter "tci-StatesPDCCH", a QCL assumption of the corresponding CORESET may be determined based on the corresponding TCI state.

network may indicate a TCI state to be actually applied among a plurality of TCI states to a UE. This may also be applied to the case that TCI states are not configured for a CORESET, and MAC CE may select a TCI state in a predetermined pool and signal it (without "tci-StatesPDCCH" in the CORESET). The pool for MAC CE signaling may be determined as below.

Option 1) TCI-States

A TCI configuration by MAC CE signaling may be performed based on "TCI-States (TCI superset, described above)". For example, in the case that the number of maximum states that may be included in "TCI-States" is 64, MAC CE signaling may indicate a specific TCI state using 6 bits. In the case that option 1 is used, this means that a TCI configuration is indicated by a bit length based on the maximum number of TCI states. This may also mean that a bit length is determined based on the maximum number of TCI states without regard to the actually configured TCI states. In the case that a UE is not signaled with "tci-StatesPDCCH" in a CORESET configuration, the UE may be signaled with one of TCI states of "TCI-States" separately signaled by MAC CE and use it as the TCI information of the corresponding CORESET.

TABLE 5

-- A subset of the TCI states defined in TCI-States used for providing QCL relationships between the DL RS(s) in one RS Set
-- (TCI-State) and the PDCCH DMRS ports. Corresponds to L1 parameter 'TCI-StatesPDCCH'
tci-StatesPDCCH    SEQUENCE(SIZE (1..maxNrofTCI-StatesPDCCH)) OF TCI-StateId
       OPTIONAL, -- Need R According to the table above, "tci-StatesPDCCH" may be defined as a subset of a plurality of TCI states defined in "TCI-States". In the present disclosure, for the convenience of the disclosure contents description, "TCI-States" which is a superset of "tci-StatesPDCCH" may be written by "TCI superset". Here, "TCI-States" may mean a TCI set signaled for other use (e.g., PDSCH) except a control channel use, and may be a superset including the "tci-StatesPDCCH" of a control channel use.

That is, QCL assumption of a NR control channel may be determined by "tci-StatesPDCCH" which is configured for each CORESET, and "tci-StatesPDCCH" may be defined as a subset of "TCI-states" which is another RRC parameter. A UE may determine a reception beam assumed when receiving the corresponding CORESET according to the TCI information of each CORESET.

"tci-StatesPDCCH" in a CORESET may be an optional parameter. In this case, it is required a default TCI (or QCL) assumption for a CORESET in which "tci-StatesPDCCH" is not configured. The present disclosure proposes a processing method for a CORESET in which "tci-StatesPDCCH" is not configured (hereinafter, this may be referred to 'TCI-less CORESET' for the convenience of description). The method described below may be implemented independently or in combination. As an example, the corresponding application method may be determined by the process performed most recently among method 1 and method 3 below.

Method 1) Medium Access Control (MAC) Control Element (CE) Signaling

Figure 14:
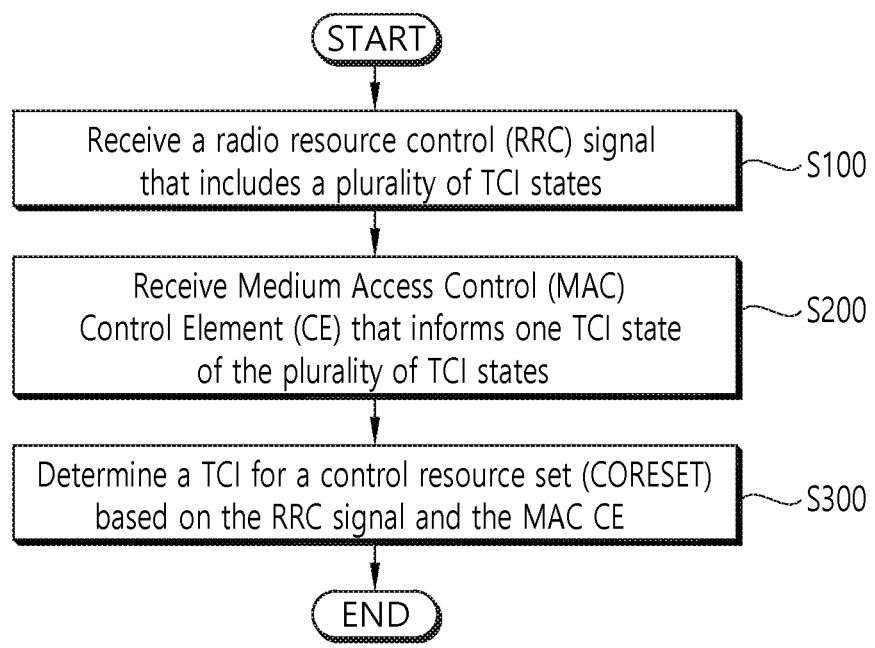
FIG. 14 illustrates a method for determining a Transmission Configuration Indicator (TCI) of a UE according to an embodiment of the present disclosure.

Basically, in the case that a plurality of TCI states is configured for a specific CORESET by RRC signaling, a FIG. 14 illustrates a method for determining a Transmission Configuration Indicator (TCI) of a UE according to an embodiment of the present disclosure.

Referring to FIG. 14, a UE receives a radio resource control (RRC) signal that includes a plurality of TCI states (step, S100).

The UE receives Medium Access Control (MAC) Control Element (CE) that informs one TCI state of the plurality of TCI states (step, S200).

The UE determines or identifies a TCI for a control resource set (CORESET) based on the RRC signal and the MAC CE (step, S300). That is, the UE may determine or identify a TCI (TCI state) for a CORESET based on the RRC signal or the MAC CE. In other words, the UE may be configured with a TCI (TCI state) for a CORESET through the RRC signal or the MAC CE. When it is represented in an aspect of base station (network), the base station may configure with a TCI (TCI state) for a CORESET to the UE through the RRC signal or the MAC CE.

Hereinafter, each of steps shown in FIG. 14 is described in detail.

First, the RRC signal may be a first RRC signal including TCI states related to a physical downlink shared channel (PDSCH) or a second RRC signal including TCI states related to a physical downlink control channel (PDCCH).

Particularly, the first RRC signal may include the contents shown in the table below.

TABLE 6

| PDSCH-Config ::= | SEQUENCE { | | |
|---|---|---|---|
| dataScramblingIdentityPDSCH | INTEGER (0..1023) OPTIONAL, | -- Need S | |
| dmrs-DownlinkForPDSCH-MappingTypeA | SetupRelease { DMRS-DownlinkConfig } | OPTIONAL, | -- Need M |
| dmrs-DownlinkForPDSCH-MappingTypeB | SetupRelease { DMRS-DownlinkConfig } | OPTIONAL, | -- Need M |
| tci-StatesToAddModList | SEQUENCE (SIZE(1..maxNrofTCI-States)) OF TCI-State | OPTIONAL, | -- Need N |
| tci-StatesToReleaseList | SEQUENCE (SIZE(1..maxNrofTCI-States)) OF TCI-StateId | OPTIONAL, | -- Need N |
| ... | | | |

In the table above, 'tci-StatesToAddModList' may be a list of a Transmission Configuration Indicator (TCI) that includes QCL-relations between downlink reference signals (DL RSs) and PDSCH DMRS ports in a single reference signal (RS) set. That is, the first RRC signal may include TCI states related to a PDSCH.

The second RRC signal may include the contents shown in the table below.

the MAC CE may indicate a TCI state among the TCI states related to the PDSCH included in the first RRC signal, and in the case that the CORESET is not the specific CORESET (e.g., CORESET of which CORESET ID is not 0), the MAC CE may indicate a TCI state among the TCI states related to the PDCCH included in the second RRC signal. That is, the MAC CE may indicate a TCI state among the TCI states indicated by different RRC signals depending on whether

TABLE 7

```
ControlResourceSet ::=           SEQUENCE {
    controlResourceSetId             ControlResourceSetId,
    frequencyDomainResources         BIT STRING (SIZE (45)),
    duration                         INTEGER (1..maxCoReSetDuration),
    cce-REG-MappingType              CHOICE {
        interleaved                      SEQUENCE {
            reg-BundleSize                   ENUMERATED {n2, n3, n6},
            interleaverSize                  ENUMERATED {n2, n3, n6},
            shiftIndex               INTEGER(0..maxNrofPhysicalResourceBlocks-1)        OPTIONAL -
- Need S
        },
        nonInterleaved                   NULL
    },
    precoderGranularity              ENUMERATED {sameAsREG-bundle, allContiguousRBs},
    tci-StatesPDCCH-ToAddList        SEQUENCE(SIZE (1..maxNrofTCI-StatesPDCCH)) OF TCI-
StateId OPTIONAL, -- Cond NotSIB1-initialBWP
    tci-StatesPDCCH-ToReleaseList    SEQUENCE(SIZE (1..maxNrofTCI-StatesPDCCH)) OF TCI-
StateId OPTIONAL, -- CondNotSIB1-initialBWP
    tci-PresentInDCI                 ENUMERATED {enabled} OPTIONAL,      -- Need S
    pdcch-DMRS-ScramblingID          INTEGER (0..65535) OPTIONAL,        -- Need S
    ...
}
```

In the table, 'tci-StatesPDCCH-ToAddList' may be a subset of the TCI states defined in the 'PDSCH-Config' shown in Table 6 and may be used for providing a QCL relation between downlink reference signal(s) (DL RSs) in a single reference signal (RS) set (TCI-state) and PDCCH DMRS ports. That is, the second RRC signal may include TCI states related to a PDCCH. Further, the TCI states related to the PDCCH included in the second RRC signal may be a subset of the TCI states related to the PDSCH included in the first RRC signal.

Figure 15:
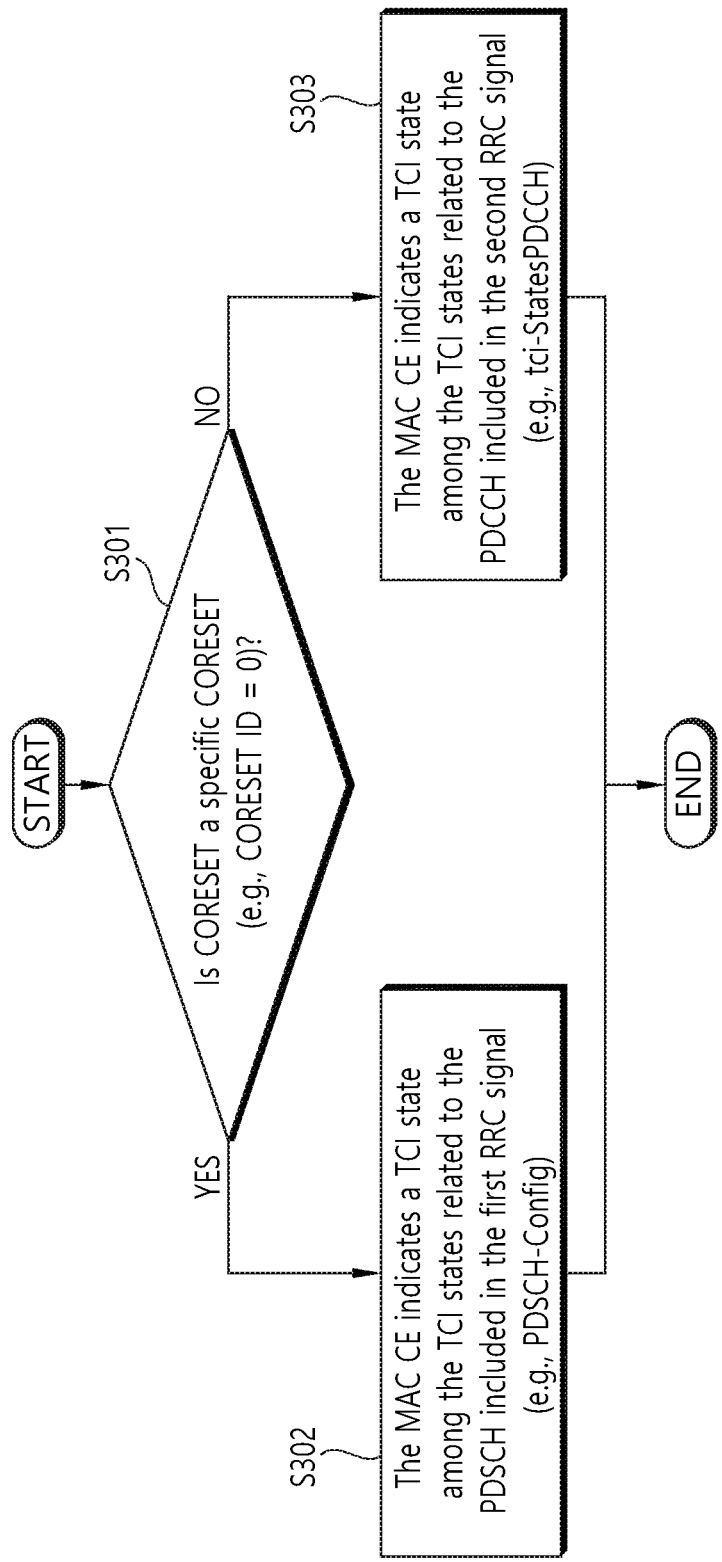
FIG. 15 is a more particular example of step S300 of FIG. 14.

FIG. 15 is a more particular example of step S300 of FIG. 14.

Referring to FIG. 15, a UE determines whether a corresponding CORESET is a specific CORESET (e.g., CORESET ID=0) (step, S301). In the case that the CORESET is the specific CORESET, the MAC CE may indicate a TCI state among the TCI states related to the PDSCH included in the first RRC signal (e.g., PDSCH-Config) (step, S302). In the case that the CORESET is not the specific CORESET, the MAC CE may indicate a TCI state among the TCI states related to the PDCCH included in the second RRC signal (e.g., tci-StatesPDCCH ('tci-StatesPDCCH-ToAddList' and/or 'tci-StatesPDCCH-ToReleaseList')) (step, S303).

That is, as described in FIG. 14 and FIG. 15, in the case that the control resource set (CORESET) is the specific CORESET (e.g., CORESET of which CORESET ID is 0), the CORESET is the specific CORESET. For example, CORESET #0 (CORESET ID=0) is a CORESET configured by a PBCH and a configuration scheme and a property thereof may be different from those of other CORESETs, and in this aspect, CORESET #0 and other CORESET (e.g., CORESET #1) may have different RRC configuration to be received. In the present disclosure, in configuring/indicating a TCI state of a CORESET, different properties of the CORESET are considered. As a result, it is available TCI state configuration/indication of more efficient and reliable.

Option 2) CORESETs with TCI State

MAC CE signaling may be interpreted to select one of CORESETs in which a TCI is configured. This may mean that the TCI (or QCL) assumed in a CORESET selected by MAC CE (another CORESET of which TCI state is different) is also applied the CORESET to which MAC CE signaling is applied.

For example, CORESETs #4, 5 and 6 are configured for a specific BWP, and in the case that a TCI state is defined in CORESET #4 and 6 but a TCI state is not defined in CORESET #5, a network may signal MAC CE by selecting a TCI state of CORESET #5 as one of the TCI state of CORESET #4 and 6. As an example, MAC CE signaling may be configured with 1 bit since the number of maximum number of CORESETs configurable for a single BWP is 3, and 0 or 1 may be selected based on the selected CORESET index.

Option 3) Transmitted SSBs

MAC CE signaling may be determined based on SSBs transmitted in a corresponding cell. Here, the SSBs transmitted in the corresponding cell may mean SSB information transmitted in the corresponding cell to a UE through broadcast signaling or UE-dedicated signaling. The UE may know SSBs which is a pool of MAC CE signaling based on available information on a corresponding occasion. At this time, a bit length of the MAC CE signaling may be determined based on a maximum number of the SSBs. For example, in the case that the maximum number of the SSBs is 64, a bit length of the corresponding MAC CE signaling may be 6 bits. As another method for determining a bit length of the MAC CE signaling, a bit length may be determined based on the number of transmitted SSBs. For example, in the case that the number of transmitted SSBs is 9, the MAC signaling may be performed by using 4 bits.

Method 2) Default TCI State

A Default TCI state may mean a TCI state implicitly determined in the case that a TCI state is not configured for a CORESET. The following method may be considered.

Option 1) Method of Following Default CORESET/Search Space Set

A TCI of a CORESET in which a TCI state is not configured may be predefined to use a TCI state of a default CORESET and/or a CORESET associated with a default search space set. As an example, a TCI state is configured among the CORESETs that a current UE is configured with, and a CORESET of which index is the lowest may be designated as a default CORESET. Similarly, a CORESET associated with a search space set of the lowest index (to which a TCI state is configured) may be designated as a default CORESET among the search space sets which is configured (in a corresponding BWP).

Option 2) Default Search Space Set Based on a Search Space Type

A search space set may be distinguished into CSS and USS, and it may be predefined such that a default search space set is selected among CSSs (or USSs). In the case that a default search space set is selected among CSSs and there is a plurality of common search space (CSS) sets, the method of option 1) described above may be applied to a plurality of common search space sets. That is, a TCI of a CORESET in which a common search space set having the lowest index among the common search space sets is associated (to which a TCI state is configured) may be applied as a TCI of the TCI-less CORESET.

Method 3) TCI State Based on RACH Procedure

A TCI of a CORESET in which a TCI state is not configured may be determined based on RACH procedure which is most recently performed. That is, a transmission beam (of a base station) and a reception beam (of a UE) assumed for receiving a random access response (RAR) in the RACH procedure may be applied to the TCI-less CORESET.

Method 3 may be differently applied according to a search space set type or a search space set index. For example, in the case of a CORESET used for CSS use, it may be regarded that only a TCI configuration based on SSB index is valid. That is, even in the case that the RACH procedure is performed, in the case that transmission/reception beam assumed in the corresponding RACH procedure is not based on SSB index or associated SSB information is unknown, the TCI information acquired by the corresponding RACH procedure may not be used as the TCI information of a CORESET used for CSS use. This may also be applied to the case that even one of the search space sets associated with the corresponding CORESET has a search space set configured with CSS.

The methods proposed above may be independently applied or applied in combination to the TCI-less CORESET. For example, TCI information may be changed based on an event most recently generated between method 1) and method 3), and it may be predefined that in the case that both of methods 1) and 3) are not valid, method 2) is applied.

As another example, in the case that option 1) of method 1) is used and a TCI superset is reconfigured, it may be operated as below. That is, the following methods may also be applied to the case that a TCI of a CORESET in which a TCI is configured is reconfigured.

In the case that a TCI superset is reconfigured, method 2) or method 3) may be applied. For example, in the case that method 2) is applied, a TCI state of default CORESET/search space set may be applied to the corresponding CORESET. Alternatively, in the case that method 3) is applied, a TCI state determined based on the RACH procedure may be applied to the corresponding CORESET.

Method 2) and/or method 3) may be regarded as a fallback operation for a TCI state configuration. That is, in the case that an ambiguity occurs for a TCI state, a network and a UE may assume that method 2) or method 3) is applied. For example, in the case that a TCI is configured for the TCI-less CORESET or in the case that a TCI is configured but the corresponding TCI is reconfigured, a UE may perform a fallback operation for a predetermined period, and this may mean that method 2) or method 3) is applied.

A timing when a reconfiguration of TCI superset is applied may be informed by an additional signaling. That is, a new TCI may be applied only in the case that a TCI update is performed for the corresponding CORESET, and this may mean that the existing TCI state is maintained before a TCI update for the CORESET.

In the case that 'tci-statesPDCCH' in a TCI superset or CORESET configuration is changed but a TCI assumed int eh corresponding CORESET is not changed, the existing TCI may be continually assumed. That is, only in the case that a TCI state assumed in the CORESET is directly changed, a fallback operation may be performed.

Figure 16:
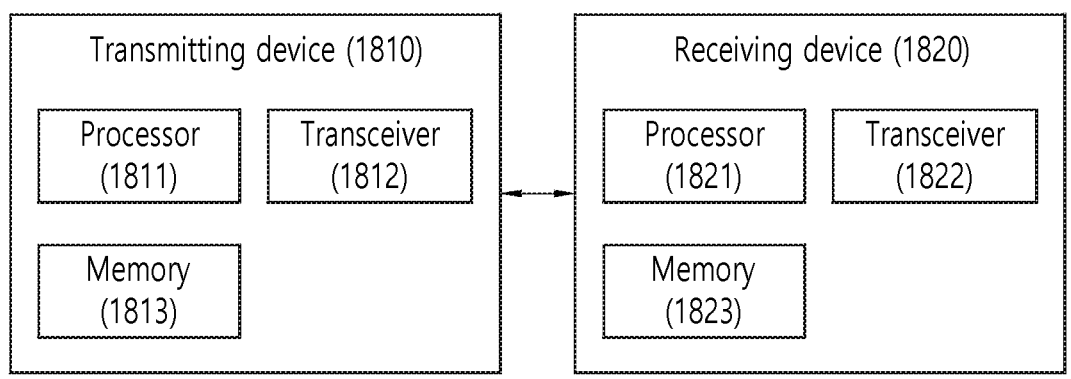
FIG. 16 is a block diagram illustrating a configuration of a transmission device 1810 and a reception device 1820 that perform the present disclosure.

FIG. 16 is a block diagram illustrating a configuration of a transmission device 1810 and a reception device 1820 that perform the present disclosure. Here, the transmission device and the reception device may be a base station (network) or a UE, respectively.

The transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of embodiments of the present disclosure.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present disclosure. The processors 1811 and 1821 may be referred to as controllers, microcontrollers, microprocessors, microcomputers, etc. The processors 1811 and 1821 can be realized by hardware, firmware, software or a combination thereof. When the present disclosure is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 1811 and 1821 or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an embodiment of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 17:
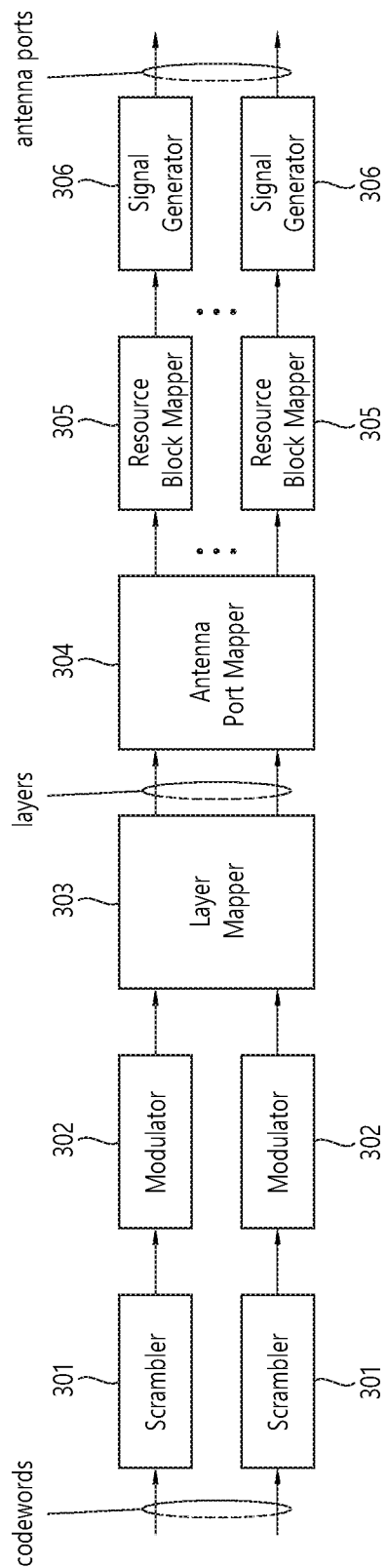
FIG. 17 illustrates an example of a signal processing module structure in the transmitting device.

FIG. 17 illustrates an example of a signal processing module structure in the transmitting device 1810. Here, signal processing can be performed by a processor of a base station/terminal, such as the processors 1811 and 1821 of FIG. 16.

Referring to FIG. 17, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 18:
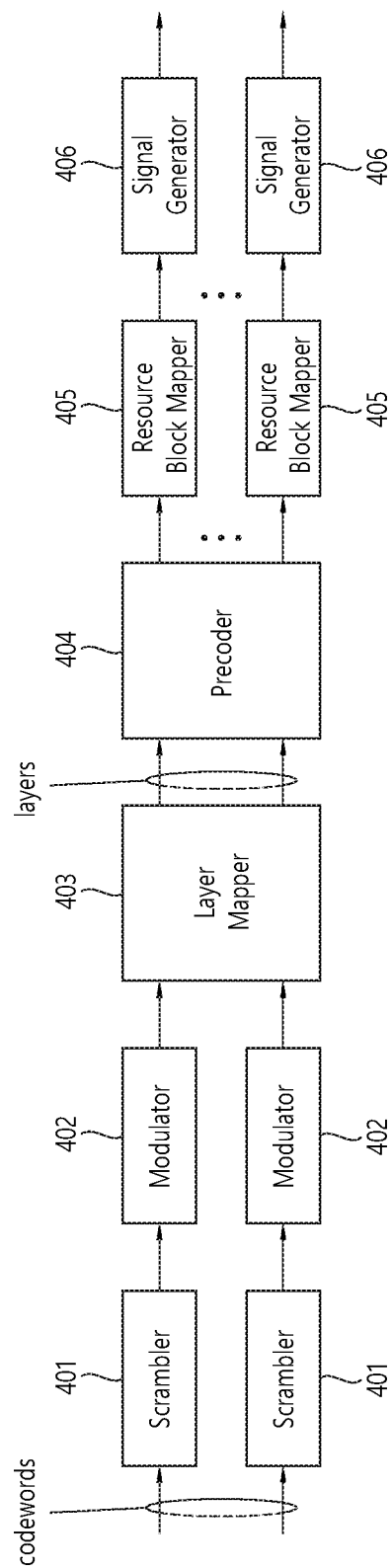
FIG. 18 illustrates another example of the signal processing module structure in the transmitting device.

FIG. 18 illustrates another example of the signal processing module structure in the transmitting device 1810. Here, signal processing can be performed by a processor of a terminal/base station, such as the processors 1811 and 1821 of FIG. 16.

Referring to FIG. 18, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit which restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit which removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 19:
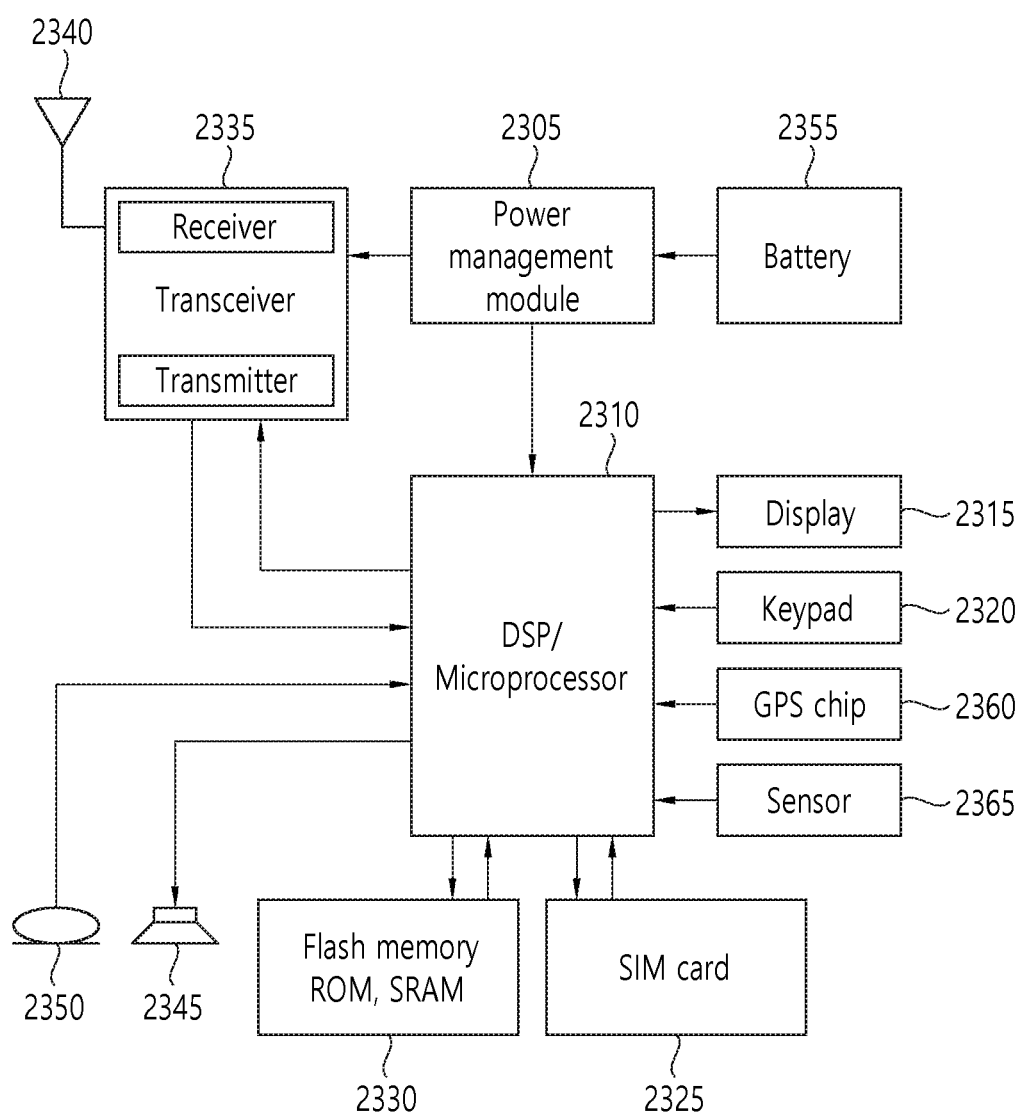
FIG. 19 illustrates an example of a wireless communication device according to an implementation example of the present disclosure.

FIG. 19 illustrates an example of a wireless communication device according to an implementation example of the present disclosure.

Referring to FIG. 19, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 19 may be the processors 1811 and 1821 in FIG. 16.

The memory 2330 is connected to the processor 2310 and stores information related to operations of the processor. The memory may be located inside or outside the processor and connected to the processor through various techniques such as wired connection and wireless connection. The memory 2330 in FIG. 19 may be the memories 1813 and 1823 in FIG. 16.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 19 may be the transceivers 1812 and 1822 in FIG. 16.

Although not shown in FIG. 19, various components such as a camera and a universal serial bus (USB) port may be additionally included in the terminal. For example, the camera may be connected to the processor 2310.

FIG. 19 is an example of implementation with respect to the terminal and implementation examples of the present disclosure are not limited thereto. The terminal need not essentially include all the components shown in FIG. 19. That is, some of the components, for example, the keypad 2320, the GPS chip 2360, the sensor 2365 and the SIM card 2325 may not be essential components. In this case, they may not be included in the terminal.

Figure 20:
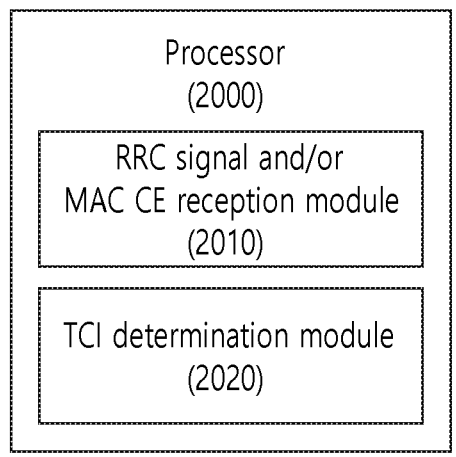
FIG. 20 illustrates an example of a processor 2000.

FIG. 20 illustrates an example of a processor 2000.

Referring to FIG. 20, a processor 2000 may include an RRC signal and/or MAC CE reception module 2010 and a TCI determination module 2020. The processor 2000 may execute the methods described in FIG. 12 to FIG. 15. For example, the processor 2000 may receive an RRC signal including a plurality of TCI states, receive MAC CE informing one TCI state among the plurality of TCI states, determine a TCI for a CORESET (control resource set) based on the RRC signal and the MAC CE, and then receive the corresponding CORESET. The processor 2000 may be an example of the processors 1811 and 1821 of FIG. 16.

Figure 21:
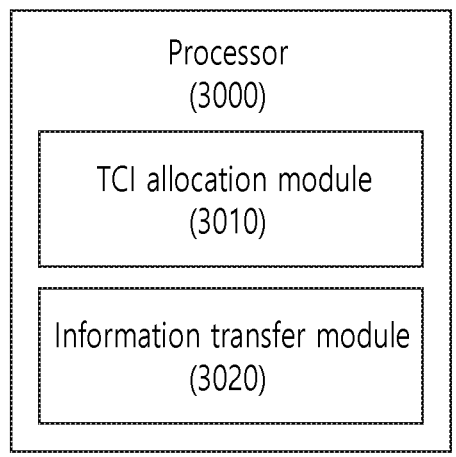
FIG. 21 illustrates an example of a processor 3000.

FIG. 21 illustrates an example of a processor 3000.

Referring to FIG. 21, a processor 3000 may include a TCI allocation module 3010 and an information transfer module 3020. The processor 3000 may execute the methods described in FIG. 12 to FIG. 15. For example, the processor 3000 may determine and allocate TCI states for each CORESET. Further, a TCI state of a CORESET may be indicated (informed) by using an RRC signal or a combination of the RRC signal and MAC CE, and accordingly, the CORESET may be transmitted (particularly, control information is transmitted in the CORESET). The processor 3000 may be an example of the processors 1811 and 1821 of FIG. 16.

Figure 22:
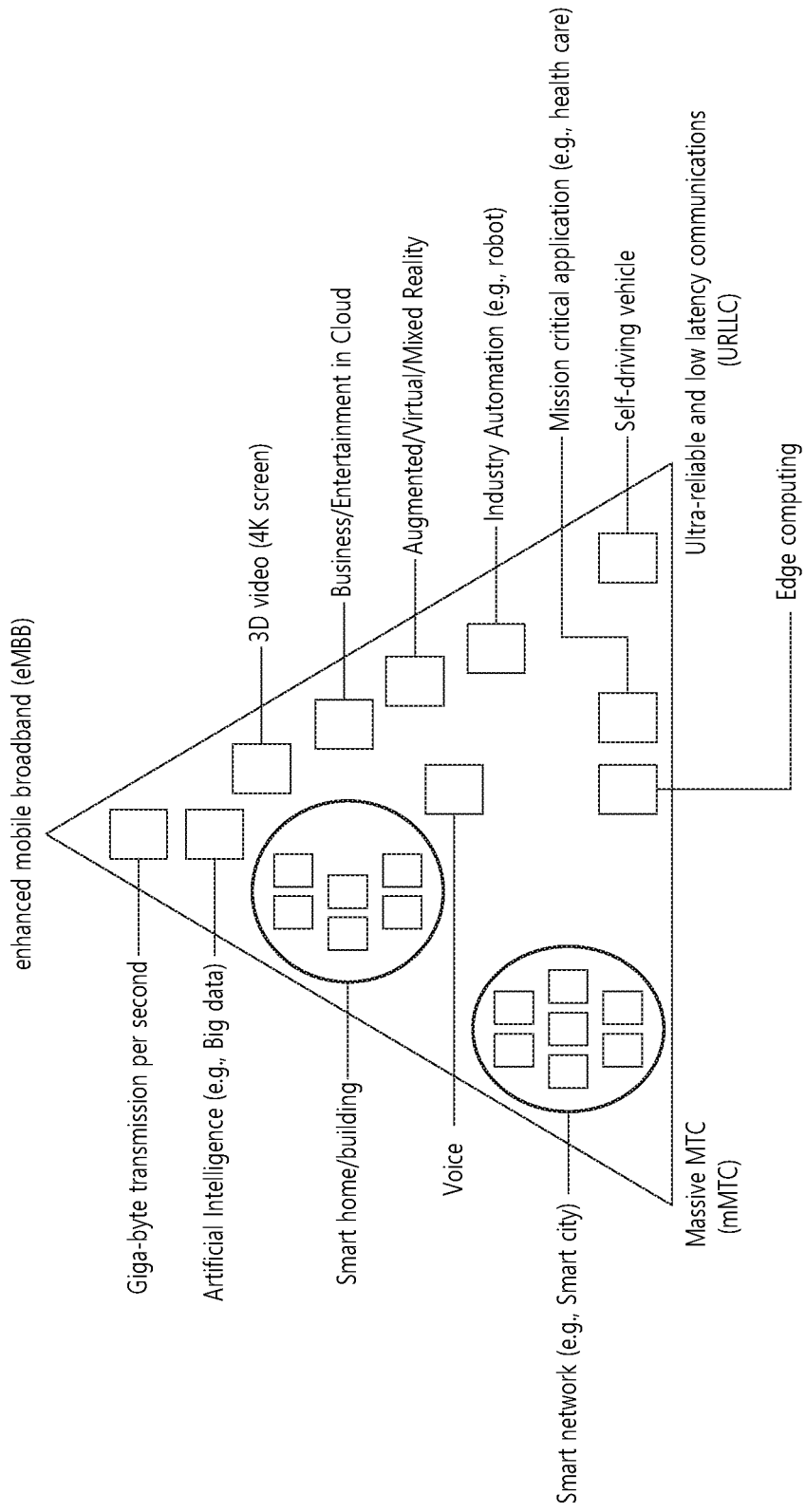
FIG. 22 illustrates an example of 5G use scenario to which the technical feature of the present disclosure may be applied.

FIG. 22 illustrates an example of 5G use scenario to which the technical feature of the present disclosure may be applied.

The 5G use scenario shown in FIG. 22 is just an illustrative, and the technical feature of the present disclosure may also be applied to other 5G use scenario which is not shown in FIG. 22.

Referring to FIG. 22, three major requirement areas of 5G include (1) an enhanced mobile broadband (eMBB) area, (2) a massive machine type communication (mMTC) area and (3) an ultra-reliable and low latency communications (URLLC) area. Some use cases may require multiple areas for optimization, and other use case may be focused on only one key performance indicator (KPI). 5G support such various use cases in a flexible and reliable manner.

eMBB is focused on overall improvement of data speed, delay, capacity of mobile broadband access and coverage. eMBB is targeted to throughput of about 10 Gbps. eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

mMTC is designed to enable a communication among a plurality of low-cost devices driven by batteries, and to support applications such as smart meter, distribution, site and body sensor. mMTC is targeted to a battery of 10 year life span and/or devices of about one million per 1 $km^2$. mMTC enables embedded sensors in all fields to be smoothly connected, and which is the one of the most expected 5G use cases. Until 2020, it is expected that potential IoT devices will reach 20.4 billion. The industry IoT is one of areas in which 5G performs major roles enabling smart city, asset tracking, smart utility, agriculture and security infra.

URLLC enables a device and a machine to communicate with very reliable, very low delay and high availability, and ideal for vehicle communication, industry control, factory automation, remote surgery, smart grid and public safety application. URLLC is targeted to a delay of about 1 ms. URLLC includes a new service which will change the industry through a link having ultra-reliability/low latency, such as remote control of major infra and a self-driving vehicle. A level of reliability and latency is essential for smart grid control, industry automation, robot engineering, drone control and adjustment.

Next, the multiple use cases included in the triangle shown in FIG. 22 are described more specifically.

5G may supplement fiber-to-the-home (FTTH) and cable-based broadband (or DOCSIS) as means for providing a stream evaluated from gigabits per second to several hundreds of mega-bits per second. Such a fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected device (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Figure 23:
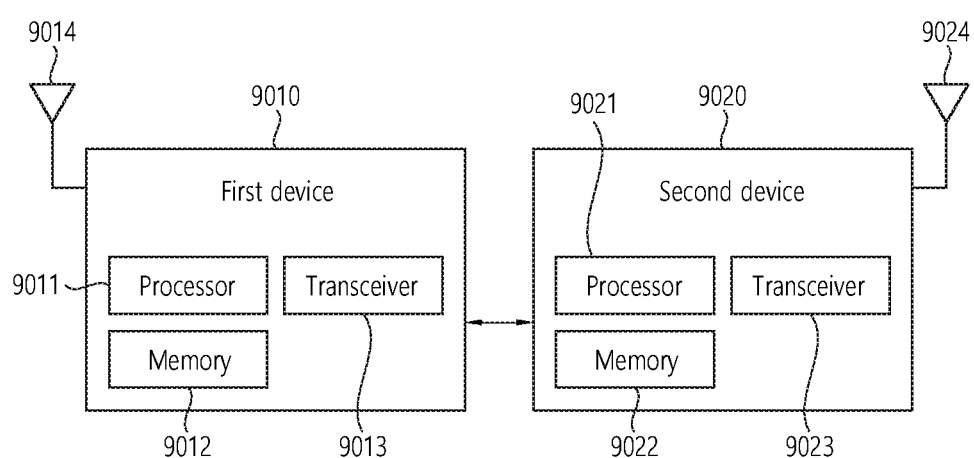
FIG. 23 illustrates a wireless communication device according to an embodiment of the present disclosure.

FIG. 23 illustrates a wireless communication device according to an embodiment of the present disclosure.

Referring to FIG. 23, a wireless communication system includes a first device 9010 and a second device 9020.

The first device 9010 may be a base station, a network node, a transmitter UE, a receiver UE, a radio device, a wireless communication device, a vehicle, a vehicle with an automatic driving function, a Connected Car, a drone (unmanned aerial vehicle (UAV)), an artificial intelligence (AI) module, a robot, an augmented reality (AR) device, a virtual reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 9020 may be a base station, a network node, a transmitter UE, a receiver UE, a radio device, a wireless communication device, a vehicle, a vehicle with an automatic driving function, a Connected Car, a drone (unmanned aerial vehicle (UAV)), an artificial intelligence (AI) module, a robot, an augmented reality (AR) device, a virtual reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a digital broadcast terminal, a personal digital assistants (PDA), a portable multimedia player (PMP), a navigator, a slate PC, a tablet PC, an ultrabook, a wearable device (e.g., a smart watch, a smart glass, a head mounted display (HMD)), or the like. For example, the HMD may be a display device which is worn on the head. For example, the HMD may be used to implement the VR, AR or MR.

For example, the drone may be an airborne vehicle that flies by a radio control signal without a person being on the flight vehicle. For example, the VR device may include a device that implements an object or a background of a virtual world. For example, the AR device may include a device that implements by connecting an object or a background of a real world with an object or a background of a virtual world. For example, the MR device may include a device that implements by fusing an object or a background of a real world with an object or a background of a virtual world. For example, the hologram device may utilize the interference phenomenon of light generated when two laser lights meet called a holography and include a device that implement 360-degree stereoscopic image by recording and playing back stereoscopic information. For example, the public safety device may include an image relay device or an image device which is wearable in a body of a user. For example, the MTC device and the IoT device may be devices that do not require a person's direct intervention or manipulation. For example, the MTC device and the IoT device may include a smart meter, a vending machine, a thermometer, a smart bulb, a door lock, a variety of sensors, or the like. For example, the medical device may be a device used for the purpose of diagnosing, treating, reducing, handling or preventing a disease. For example, the medical device may be a device used for the purpose of diagnosing, treating, reducing or amending an injury or a disability. For example, the medical device may be a device used for the purpose of testing, substituting or modifying a structure or function. For example, the medical device may be a device used for the purpose of controlling a pregnancy. For example, the medical device may include a device for medical treatment, a device for operation, a device for (external) diagnosis, a hearing aid, or a device for a surgical procedure, or the like. For example, the security device may be a device installed to prevent a possible danger and to maintain safety. For example, the security device may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

The first device 9010 may include at least one processor such as a processor 9011, at least one memory such as a memory 9012 and at least one transceiver such as a transceiver 9013. The processor 9011 may perform the function, procedure and/or methods described above. The processor 9011 may perform one or more protocols. For example, the processor 9011 may perform one or more layers of a wireless interface protocol. The memory 9012 is connected to the processor 9011 and store various types of information and/or commands. The transceiver 9013 is connected to the processor 9011 and controlled to transmit and receive a radio signal.

The second device 9020 may include at least one processor such as a processor 9021, at least one memory such as a memory 9022 and at least one transceiver such as a transceiver 9023. The processor 9021 may perform the function, procedure and/or methods described above. The processor 9021 may perform one or more protocols. For example, the processor 9021 may perform one or more layers of a wireless interface protocol. The memory 9022 is connected to the processor 9021 and store various types of information and/or commands. The transceiver 9023 is connected to the processor 9021 and controlled to transmit and receive a radio signal.

The memory 9012 and/or the memory 9022 may be connected to an interior or exterior of the processor 9011 and/or the processor 9021 and may be connected to another processor through various technique such as a wired or wireless connection.

The first device 9010 and/or the second device 9020 may have one or more antennas. For example, an antenna 9014 and/or an antenna 9024 may be configured to transmit and receive a radio signal.

The present disclosure may also be applied to the following fields.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning and is configured with artificial neurons (nodes) forming a network through a combination of synapses and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving, Autonomous Driving>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered as a robot having a self-driving function.

<eXtended Reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

Figure 24:
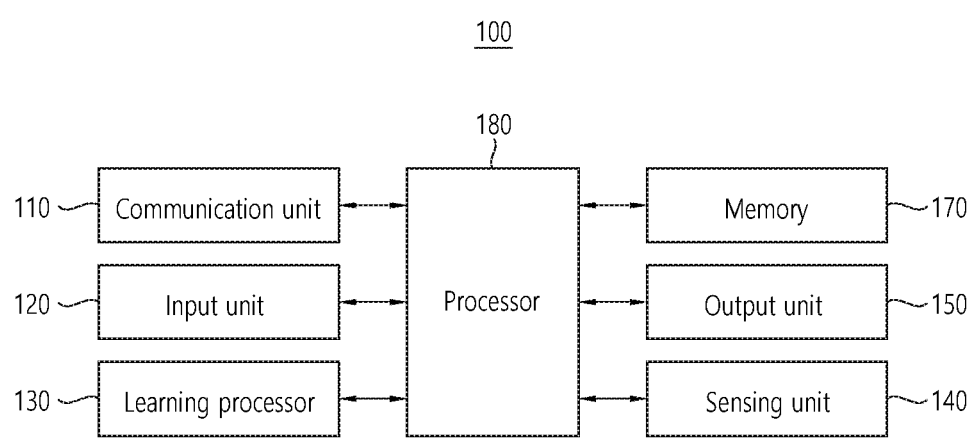
FIG. 24 illustrates an AI device 100 according to an embodiment of the present disclosure.

FIG. 24 illustrates an AI device 100 according to an embodiment of the present disclosure.

At least one method and/or device among the methods according to the present disclosure described above may be applied/included in the AI device. The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 24, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit which receives information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit which outputs visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

At this time, in the case that an association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm.

Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to execute an application program stored in the memory 170. Moreover, the processor 180 may combine and drive two or more of the elements included in the AI device 100 in order to execute the application program.

Figure 25:
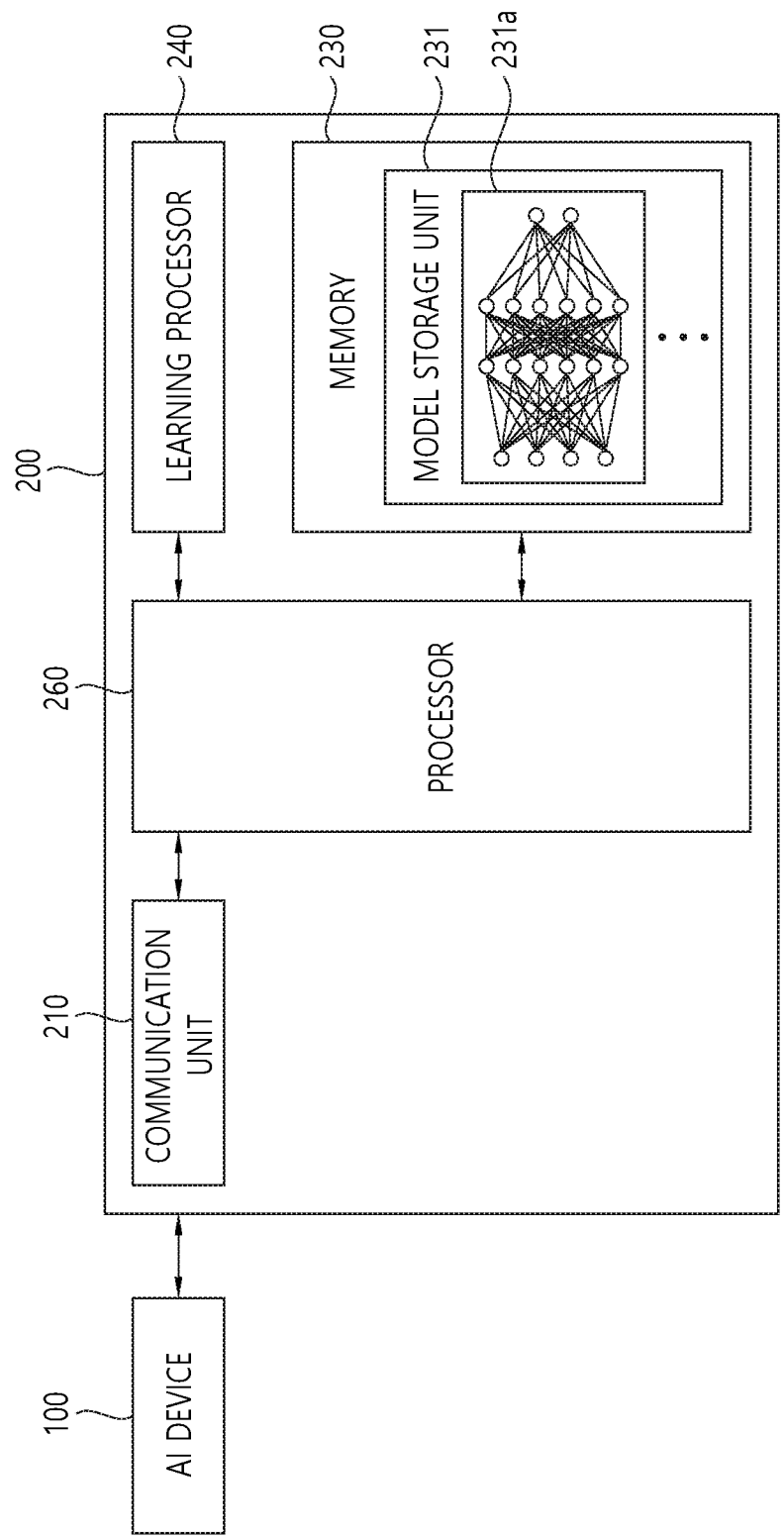
FIG. 25 illustrates an AI server 200 according to an embodiment of the present disclosure.

FIG. 25 illustrates an AI server 200 according to an embodiment of the present disclosure.

Referring to FIG. 25, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100 and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. In the case that some of or the entire learning model is implemented as software, one or more instructions configuring the learning model may be stored in the memory 230.

The processor 260 may deduce a result value of new input data using the learning model and may generate a response or control command based on the deduced result value.

Figure 26:
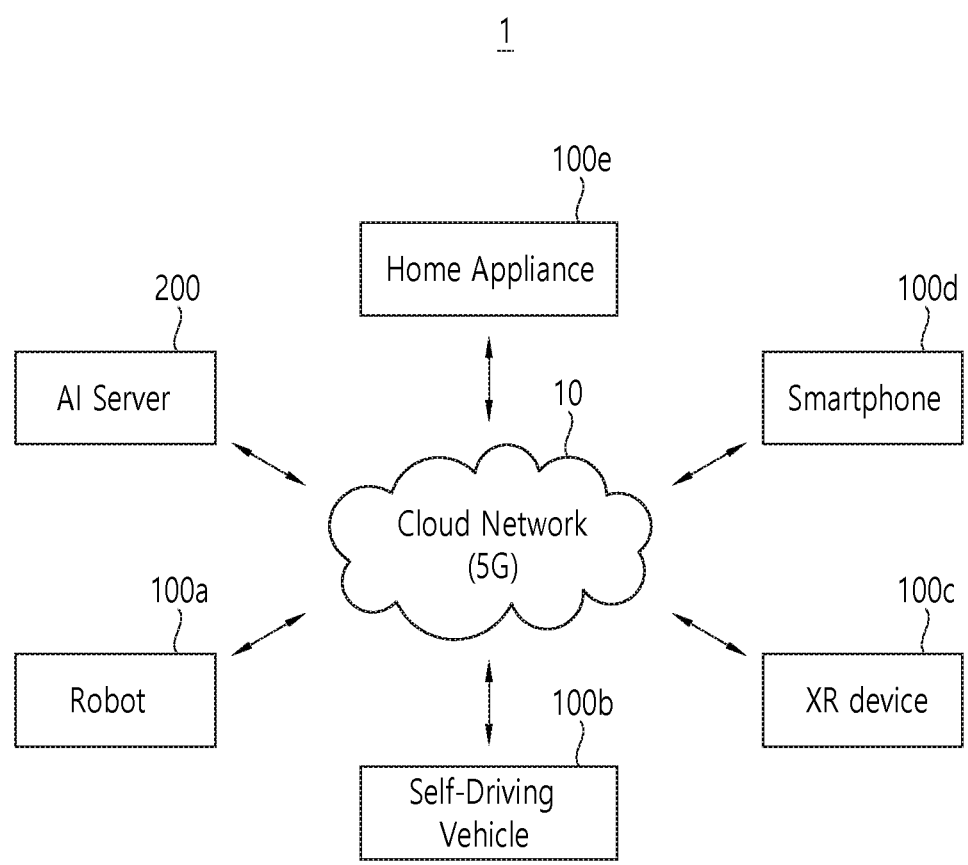
FIG. 26 illustrates an AI system 1 according to an embodiment of the present disclosure.

FIG. 26 illustrates an AI system 1 according to an embodiment of the present disclosure.

Referring to FIG. 26, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model and may generate a response or control command based on the deduced result value.

Hereinafter, various embodiments of the AI devices 100a to 100e to which the above-described technology is applied are described. In this case, the AI devices 100a to 100e shown in FIG. 3 may be considered as detailed embodiments of the AI device 100 shown in FIG. 1.

<AI+Robot>

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100*a* may directly generate results using the learning model and perform an operation but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowerpot and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

<AI+Self-Driving>

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b* but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked, or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

<AI+XR>

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation but may perform an operation by transmitting sensor information to an external device, such as the AI server 200, and receiving results generated in response thereto.

<AI+Robot+Self-Driving>

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI+Robot+XR>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

<AI+Self-Driving+XR>

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

What is claimed is:

1. A method for determining a transmission configuration indicator (TCI) of a user equipment (UE) in a wireless communication system, the method comprising:
receiving a radio resource control (RRC) signal including a plurality of TCI states;
receiving a medium access control (MAC) control element (CE) informing one TCI state among the plurality of TCI states; and
determining a TCI for a control resource set (CORESET) based on the RRC signal and the MAC CE,
wherein the RRC signal is a first RRC signal including TCI states related to a physical downlink shared channel (PDSCH) or a second RRC signal including TCI states related to a physical downlink control channel (PDCCH), and wherein based on the CORESET being a specific CORESET, the MAC CE informs one TCI state among the TCI states related to the PDSCH, and based on the CORESET not being the specific CORESET, the MAC CE informs one TCI state among the TCI states related to the PDCCH.

2. The method of claim 1, wherein the TCI states related to the PDCCH included in the second RRC signal are a subset of the TCI states related to the PDSCH included in the first RRC signal.

3. The method of claim 1, wherein the first RRC signal includes 64 TCI states related to the PDSCH.

4. A user equipment (UE), comprising:
- a transceiver for transmitting and receiving a radio signal; and
- a processor operating with being connected to the transceiver, wherein the processor is configured to:
- receive a radio resource control (RRC) signal including a plurality of TCI states,
- receive a medium access control (MAC) control element (CE) informing one TCI state among the plurality of TCI states and
- determine a TCI for a control resource set (CORESET) based on the RRC signal and the MAC CE, wherein the RRC signal is a first RRC signal including TCI states related to a physical downlink shared channel (PDSCH) or a second RRC signal including TCI states related to a physical downlink control channel (PDCCH), and wherein based on the CORESET being a specific CORESET, the MAC CE informs one TCI state among the TCI states related to the PDSCH, and based on the CORESET not being the specific CORESET, the MAC CE informs one TCI state among the TCI states related to the PDCCH.

5. The UE of claim 4, wherein the TCI states related to the PDCCH included in the second RRC signal are a subset of the TCI states related to the PDSCH included in the first RRC signal.

6. The UE of claim 4, wherein the first RRC signal includes 64 TCI states related to the PDSCH.

7. The UE of claim 4, wherein the UE communicates with at least one of a mobile terminal, a network and a self-driving vehicle except the UE.

8. A processor for a wireless communication device in a wireless communication system, wherein the processor controls the wireless communication device configured to:
- receive a radio resource control (RRC) signal including a plurality of TCI states,
- receive a medium access control (MAC) control element (CE) informing one TCI state among the plurality of TCI states and
- determine a TCI for a control resource set (CORESET) based on the RRC signal and the MAC CE, wherein the RRC signal is a first RRC signal including TCI states related to a physical downlink shared channel (PDSCH) or a second RRC signal including TCI states related to a physical downlink control channel (PDCCH), and wherein based on the CORESET being a specific CORESET, the MAC CE informs one TCI state among the TCI states related to the PDSCH, and based on the CORESET not being the specific CORESET, the MAC CE informs one TCI state among the TCI states related to the PDCCH.

9. The processor of claim 8, wherein the TCI states related to the PDCCH included in the second RRC signal are a subset of the TCI states related to the PDSCH included in the first RRC signal.

* * * * *